Dec. 24, 1957   G. A. MONTOOTH   2,817,529
PINSETTING MACHINES
Filed March 24, 1947   14 Sheets-Sheet 1

Inventor.
George A. Montooth.
By Axel A. Hofgren.
Attorney.

Dec. 24, 1957  G. A. MONTOOTH  2,817,529
PINSETTING MACHINES
Filed March 24, 1947  14 Sheets-Sheet 2

Inventor.
George A Montooth
By. Axel A. Hofgren
Attorney.

Dec. 24, 1957     G. A. MONTOOTH     2,817,529
PINSETTING MACHINES
Filed March 24, 1947     14 Sheets-Sheet 3
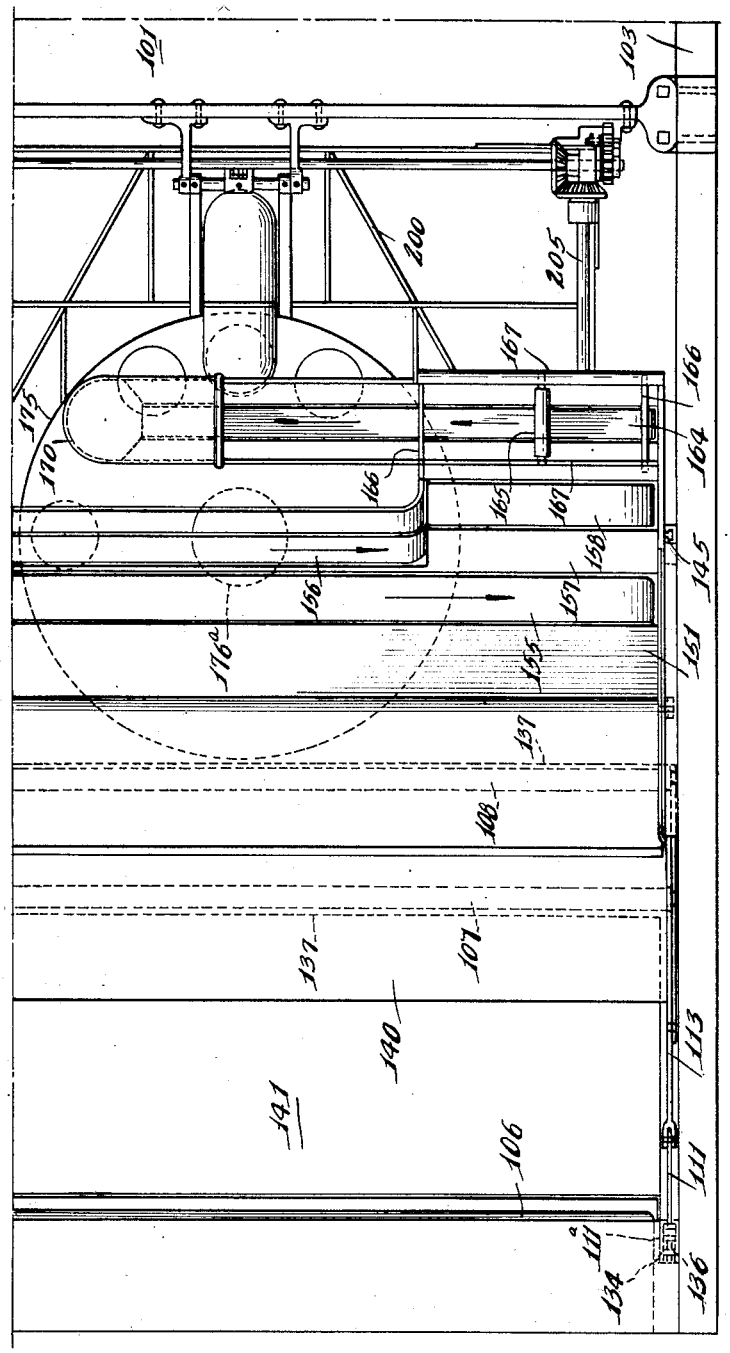
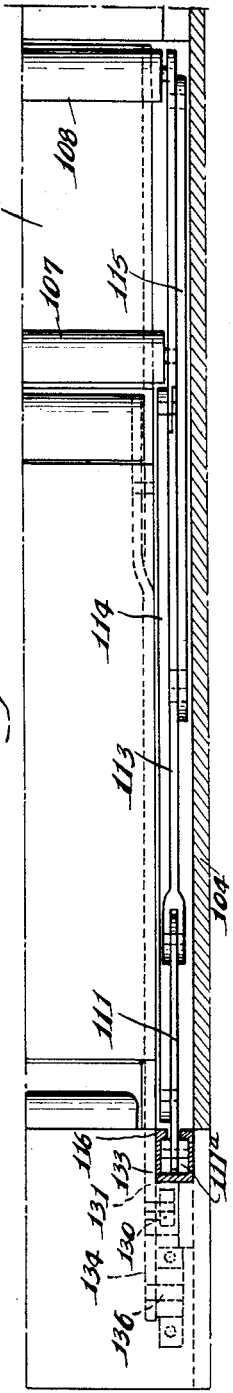
Inventor.
George A Montooth.
By Axel A. Hofgren.
Attorney.

Dec. 24, 1957   G. A. MONTOOTH   2,817,529
PINSETTING MACHINES
Filed March 24, 1947   14 Sheets-Sheet 4
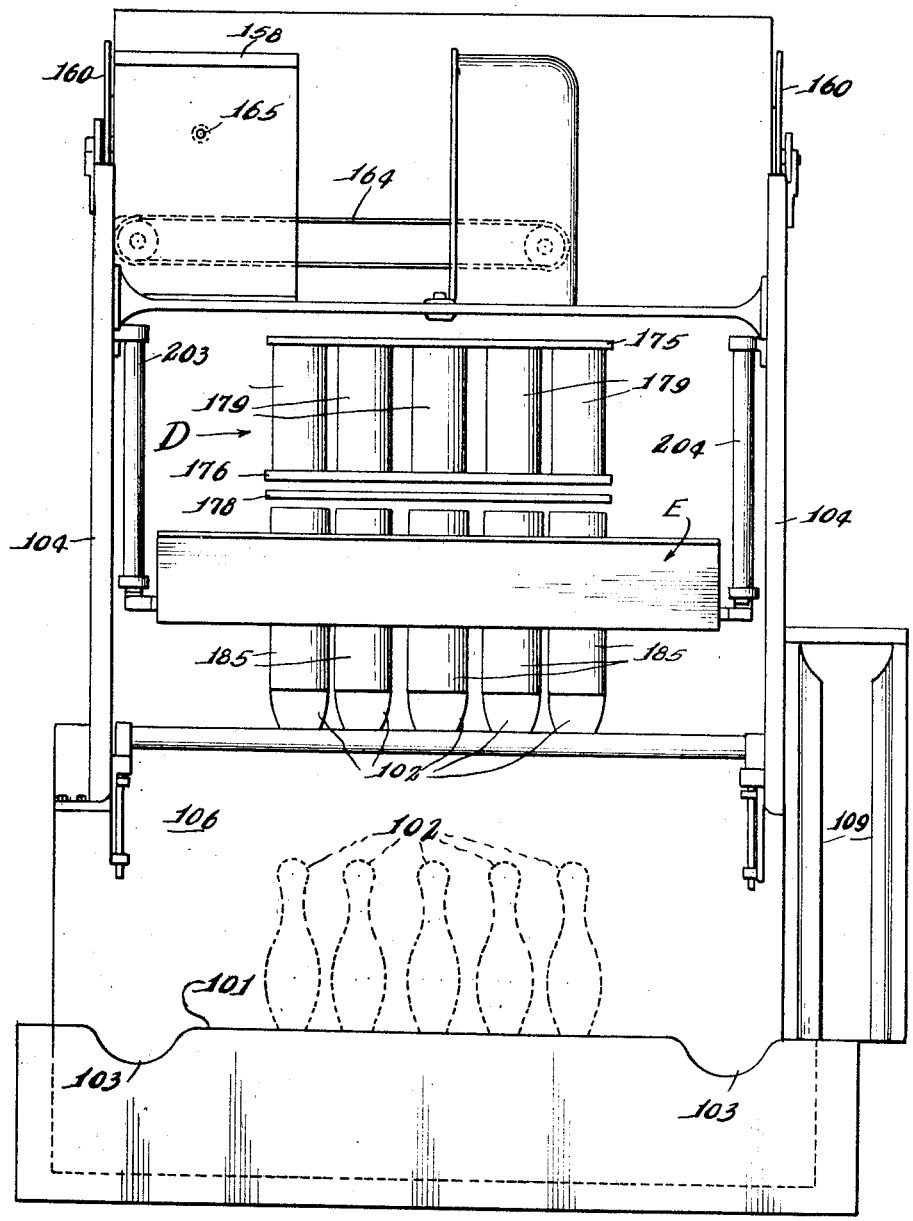

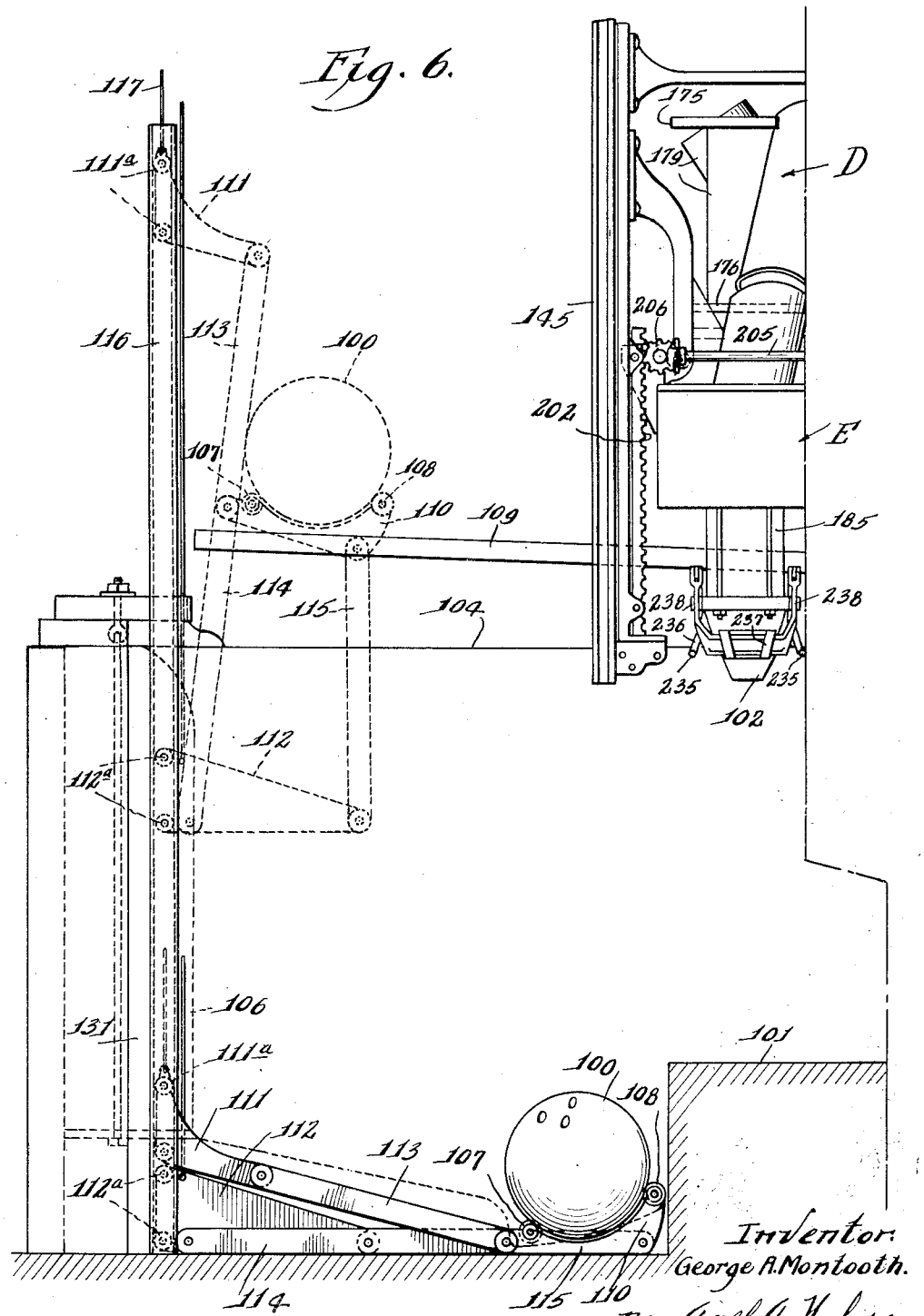

Dec. 24, 1957  G. A. MONTOOTH  2,817,529
PINSETTING MACHINES
Filed March 24, 1947  14 Sheets-Sheet 6

Inventor.
George A Montooth
By Axel A Hofgren
Attorney.

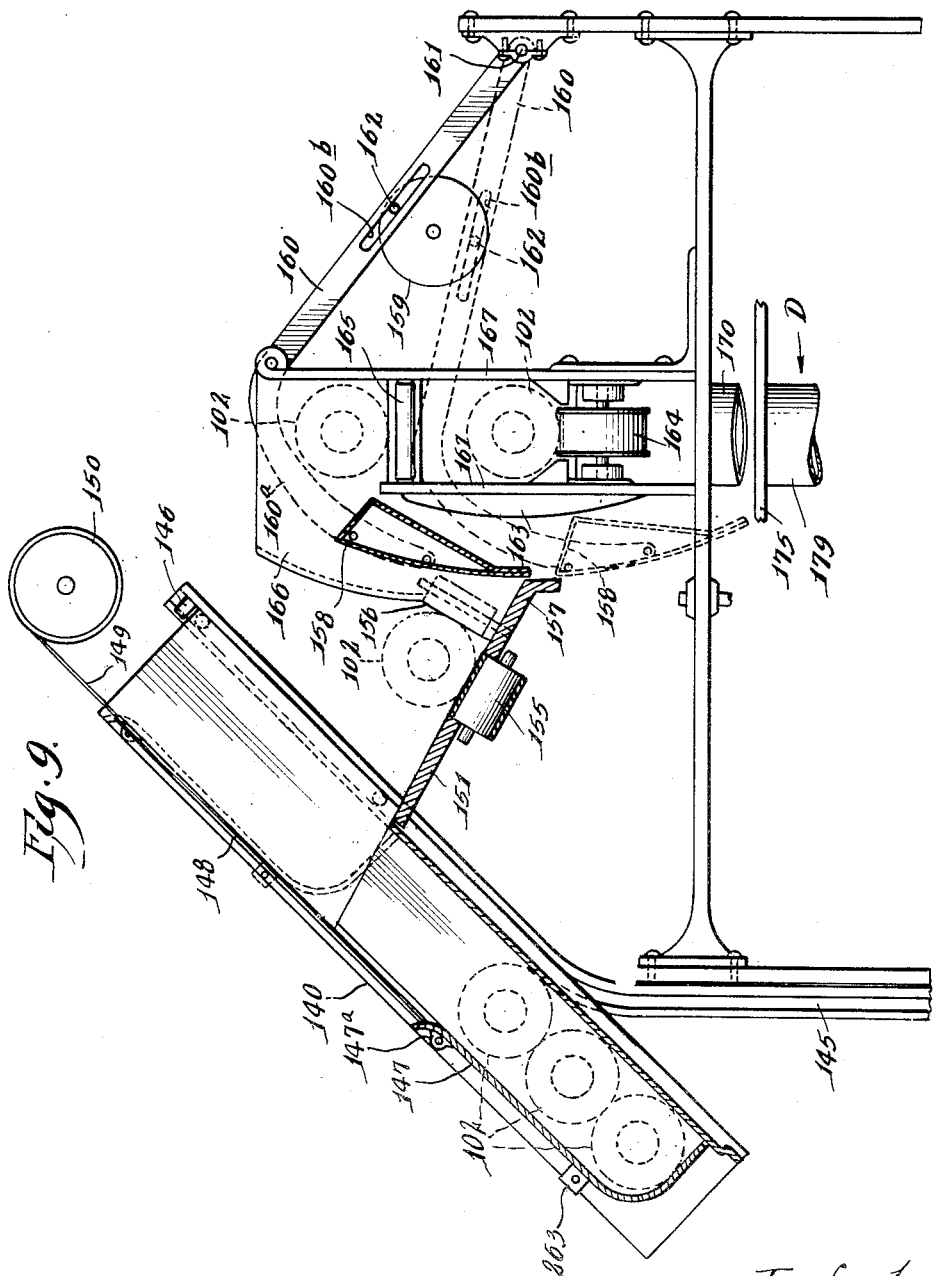

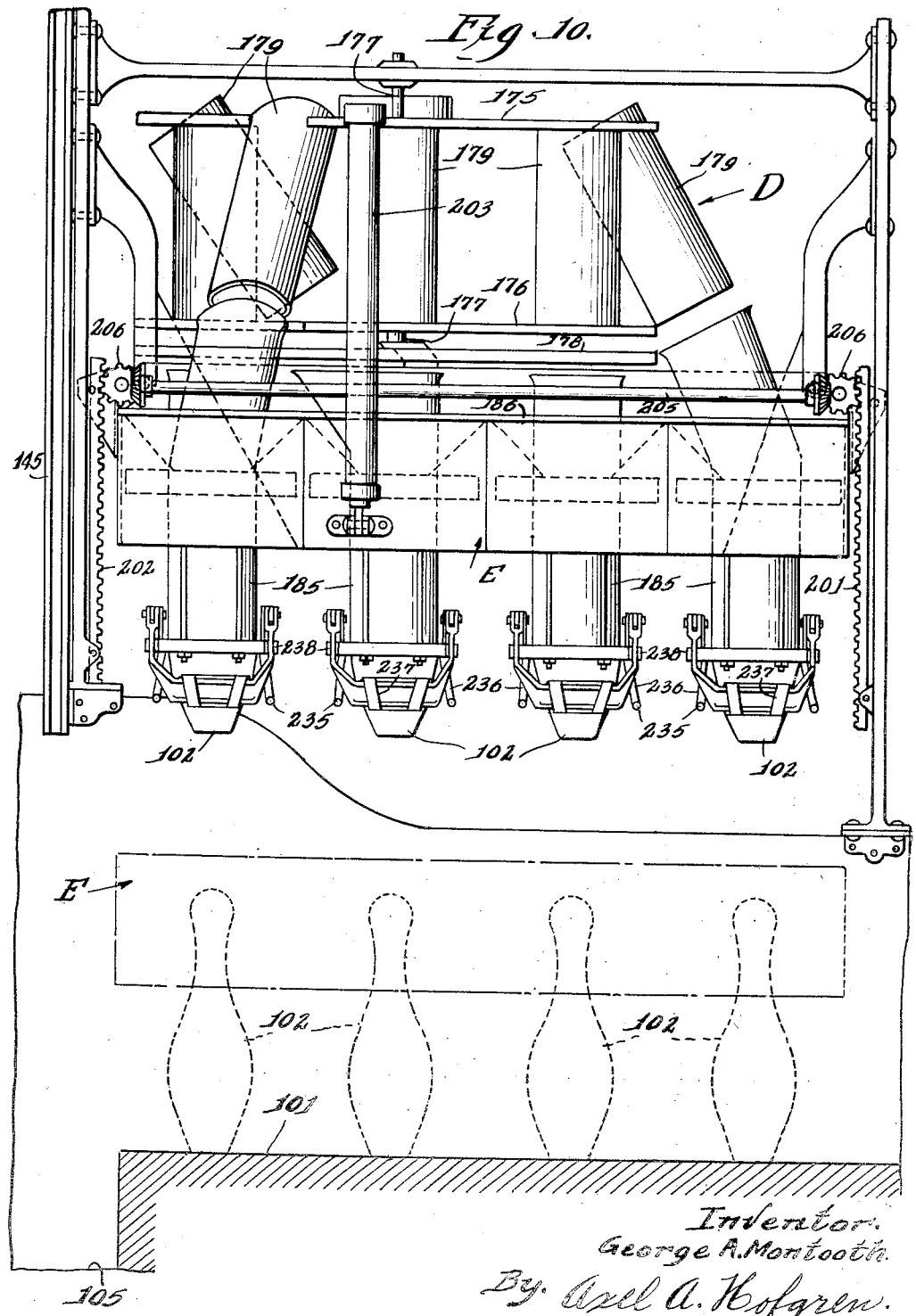

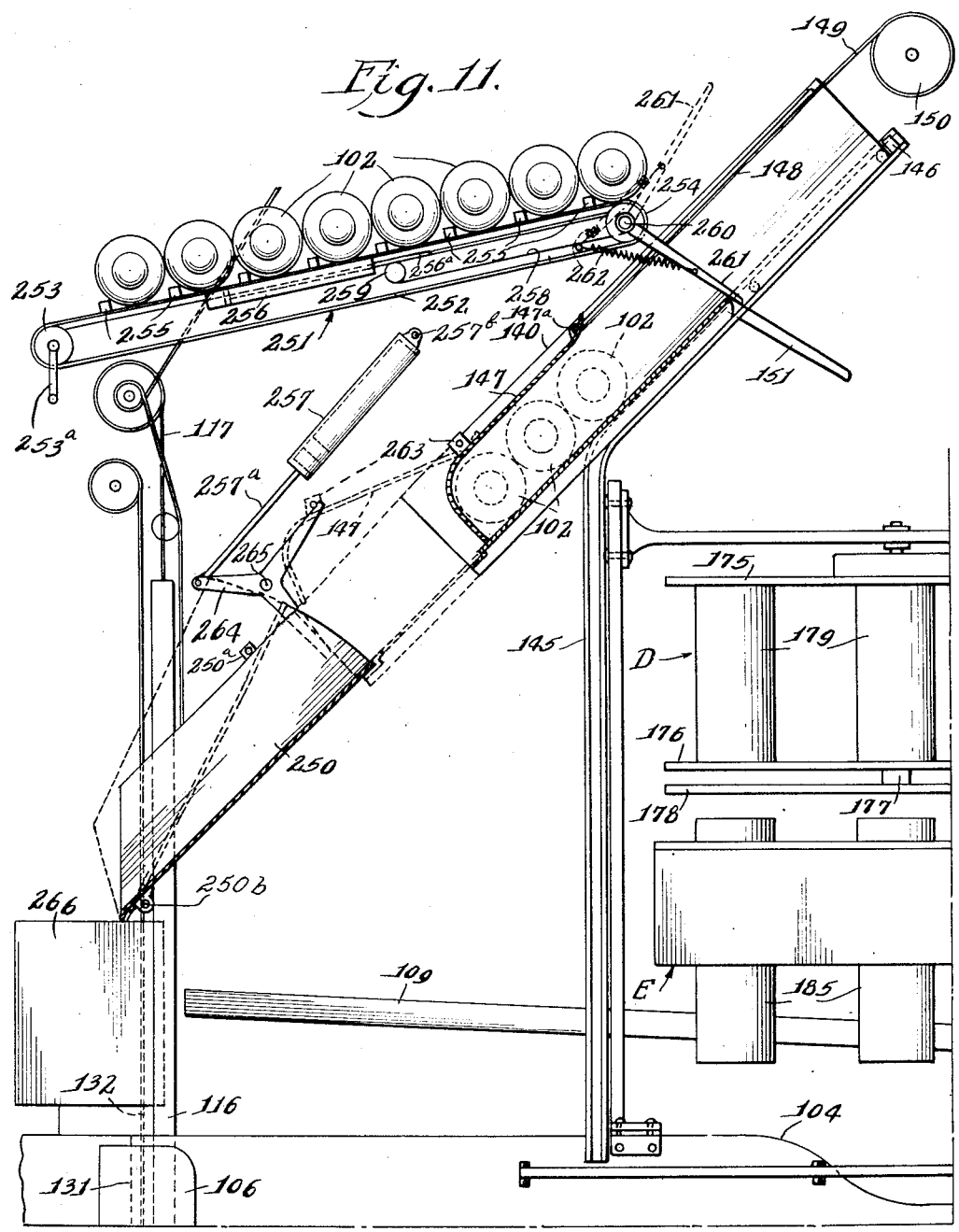

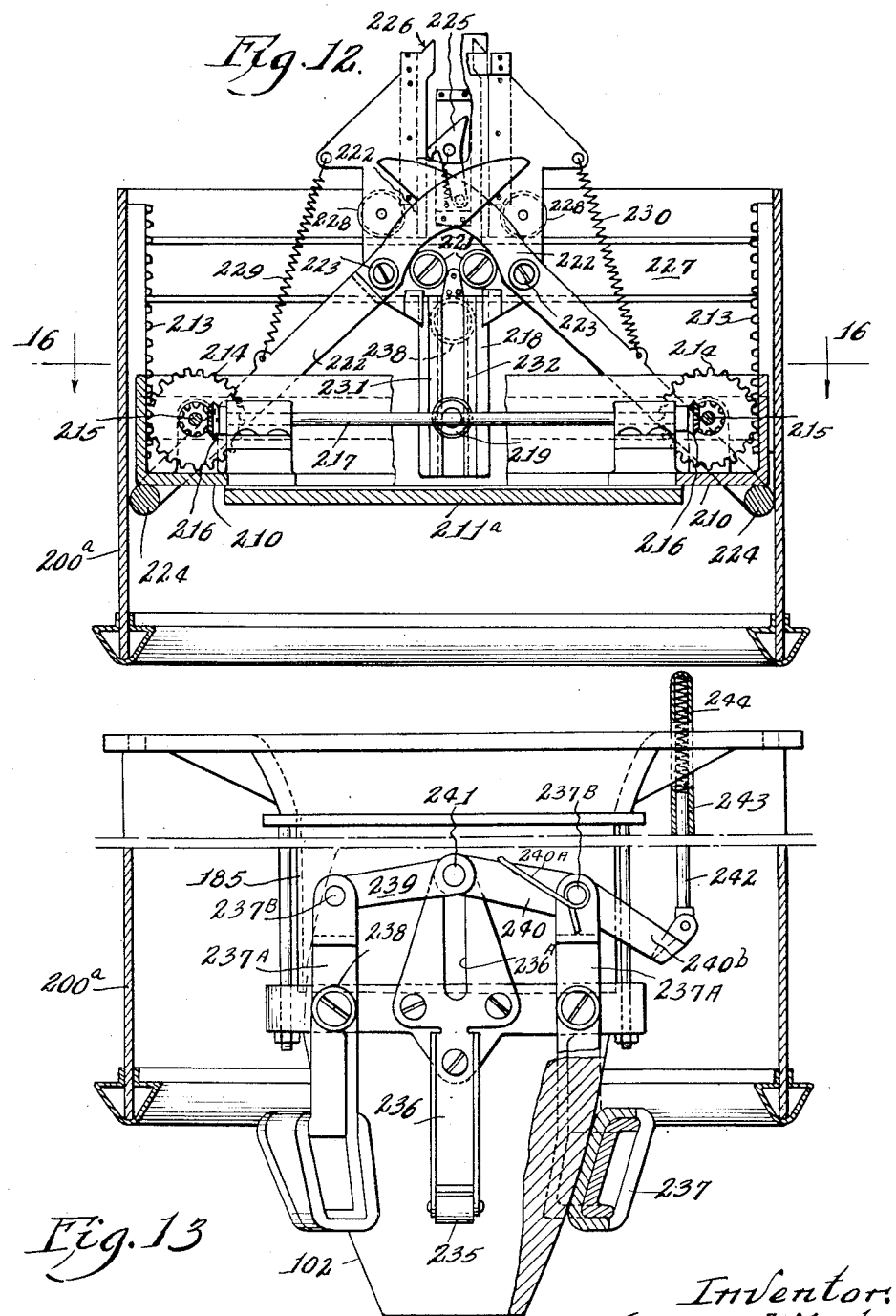

Dec. 24, 1957  G. A. MONTOOTH  2,817,529
PINSETTING MACHINES

Filed March 24, 1947  14 Sheets-Sheet 11

Inventor.
George A. Montooth.
By Axel A. Hofgren.
Attorney.

Dec. 24, 1957  G. A. MONTOOTH  2,817,529
PINSETTING MACHINES
Filed March 24, 1947  14 Sheets-Sheet 12

Inventor.
George A. Montooth.
By Axel A. Hofgren.
Attorney.

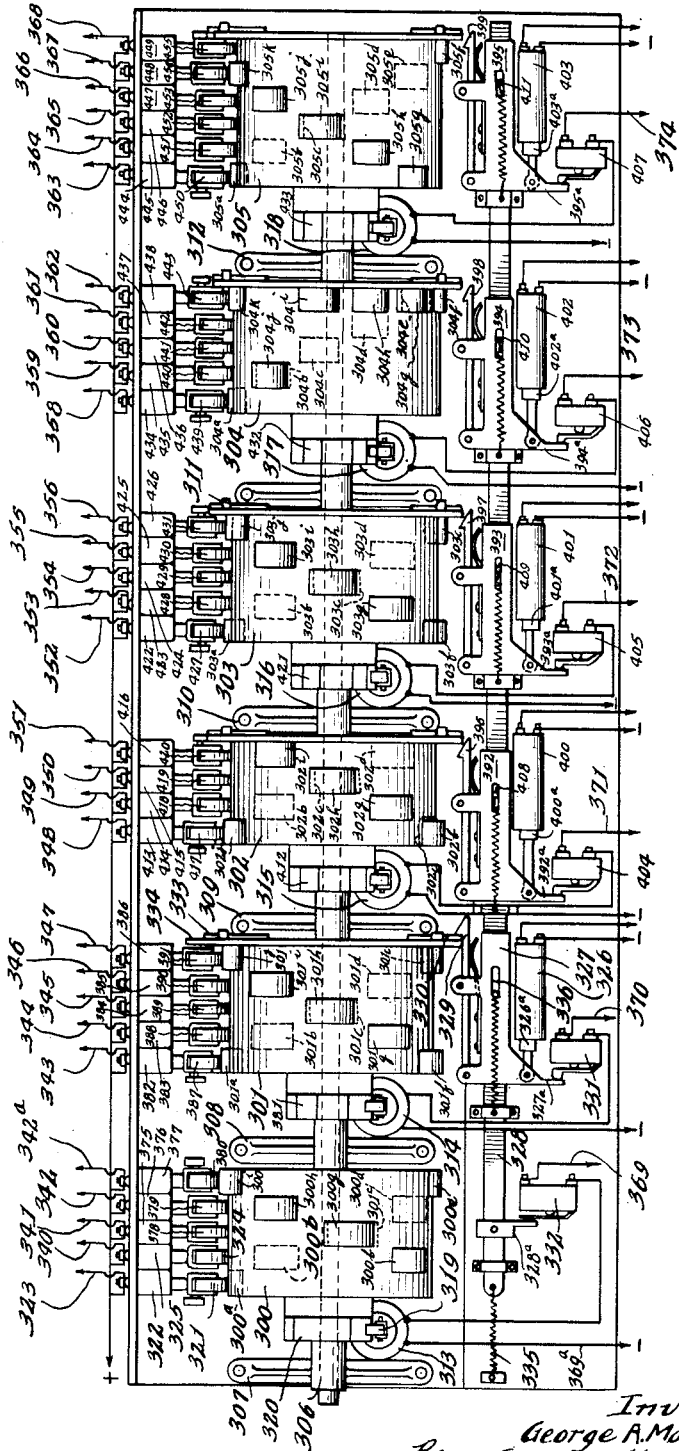

Dec. 24, 1957  G. A. MONTOOTH  2,817,529
PINSETTING MACHINES
Filed March 24, 1947  14 Sheets-Sheet 14

Inventor:
George A. Montooth
By Axel A. Hofgren
Attorney

United States Patent Office 2,817,529
Patented Dec. 24, 1957

2,817,529

PINSETTING MACHINES

George A. Montooth, Long Beach, Calif., assignor to The Brunswick-Balke-Collender Company, Chicago, Ill., a corporation of Delaware Application March 24, 1947, Serial No. 736,643

18 Claims. (Cl. 273—43)

This invention relates to a pinsetter, and more particularly to a pinsetter which is completely automatic in its operation.

The general object of the invention is to provide an improved automatic pinsetter for bowling alleys.

An object is to provide a machine of this general character which will handle the fallen pins by means of automatically controlled devices at a speed permitting bowling to proceed as rapidly as the bowler desires.

Another object of my invention is to provide a pinsetting machine wherein the entire pin handling mechanism comprises one compact unit which requires a minimum of space and which eliminates several operating movements normally required by such machines.

Another object of this invention is to provide in an automatic pinsetting machine means for removing the ball from the pit and for returning it to the players' end of the alley and means for removing pins from the pit without requiring additional space beyond the confines of the usual pit, backstop, and kickbacks found in a conventional bowling alley, thus making it possible for my improved machine to be installed on any conventional bowling alley.

Another object is to provide such a machine wherein the ball return mechanism and the mechanism for removing pins from the pit are designed in such manner as to keep the pit and the space above the pit free of all parts of the machine so that pins may be set on the alley manually if so desired.

Another object is to provide in an automatic pinsetting machine novel apparatus including a hopper adapted to receive the pins and carry them upward and discharge them into a pin arranging mechanism.

Another object of this invention is to provide automatic means for changing the entire complement of pins in use in the machine.

Another object of this invention is to provide a pin hopper normally operable to discharge pins into an arranging mechanism, and selectively operable to discharge said pins into a discharge basket so that a new set of pins may be received from an auxiliary magazine and discharged into the pin arranging mechanism.

Other objects and advantages of my invention will become apparent from the following detailed description taken in connection with the accompanying drawings, in which:

Fig. 3 is an enlarged fragmentary plan view of a portion of the apparatus shown in Fig. 2, with the automatic pin changing mechanism removed;

Fig. 4 is an enlarged plan view of a portion of the apparatus shown in Fig. 3;

Fig. 5 is a section through a bowling alley showing in front elevation certain of the basic mechanisms of the machine shown in Fig. 1;

Fig. 6 is an enlarged longitudinal section through the pit of a bowling alley, showing the ball handling apparatus in its raised position in broken lines and in its lowered position in solid lines;

Fig. 9 is a sectional view of a portion of the machine showing the pin hopper in raised position and the means for conveying pins from the pin hopper to the arranging magazine;

Fig. 10 is a side view of the pin arranging magazine and the pinsetting mechanism;

Fig. 11 is a longitudinal section above the pit of a bowling alley showing fragmentary portions of the machine, and showing the automatic pin changing mechanism in detail;

Fig. 12 is a section through one of the pin pickup units;

Fig. 13 is a section through one of the pinsetting units;

Fig. 17 is a side elevation of my improved compound program switch;

Figure 1:
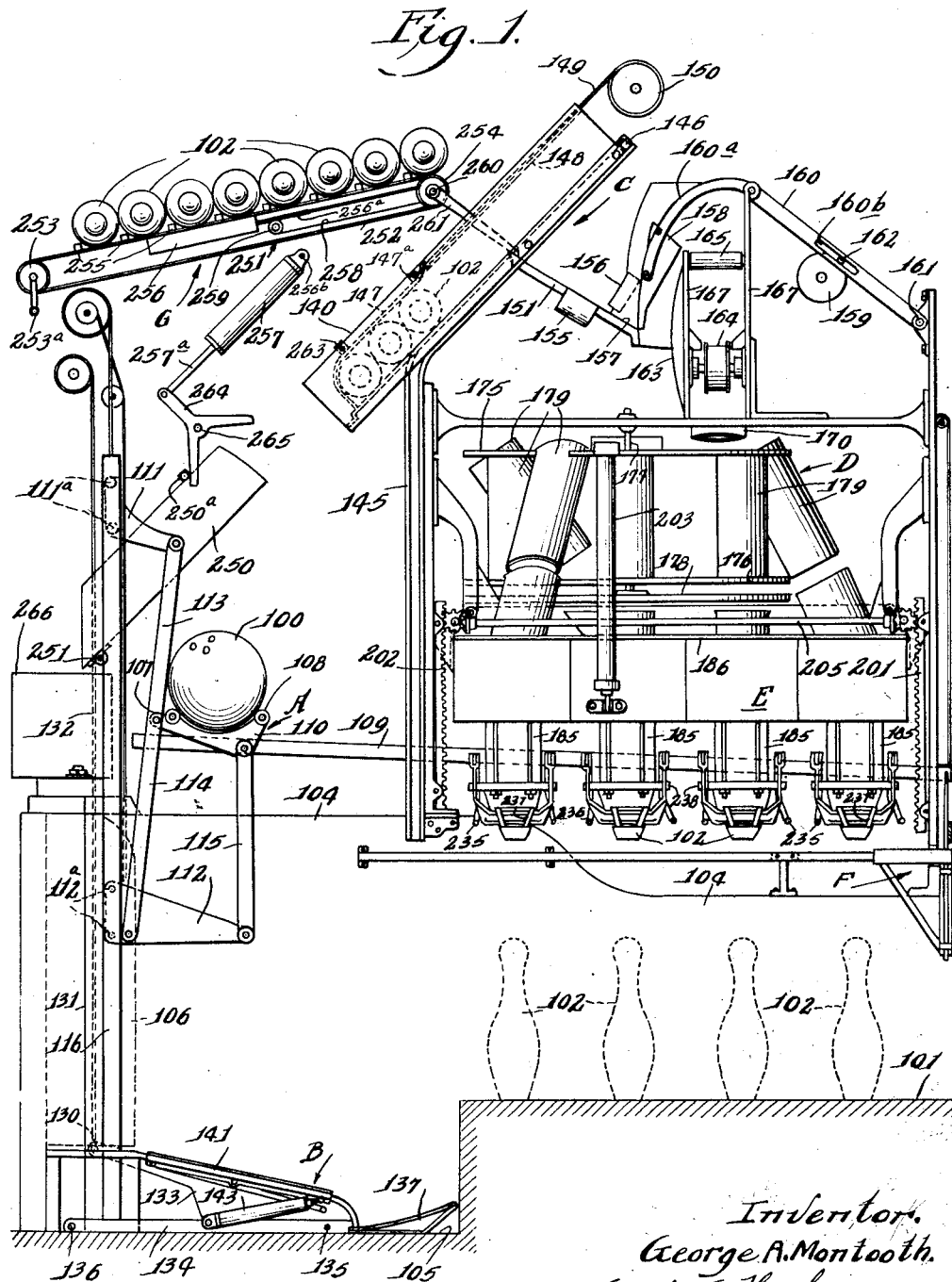
Fig. 1 is a side elevation of an automatic pinsetting machine constructed in accordance with the present invention, certain of the operating mechanisms of the machine being shown in fragmentary form.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

While the machine illustrated, described and claimed herein is shown as constructed on a conventional bowling alley and is described and claimed as a "bowling machine," it will be understood that the machine is equally applicable for use in games other than the game conventionally known as "bowling" and it will be understood that the term "bowling" as used herein is meant to include the game known as duckpins and other games similar to the game conventionally known as bowling.

This invention includes many basic principles and mechanisms which are shown and described in the co-pending application of George A. Montooth and Albert E. Bowen, Serial No. 657, 238, filed March 26, 1946, now Patent No. 2,697,605, the present invention comprising improvements upon and additions to certain of the structures shown in said application.

Among these improvements are ball and pin handling mechanisms in the pit for delivering the ball to a return track, and for delivering the pins to a pin arranging magazine; improved means for delivering pins from the pin arranging magazine to the pinsetter mechanisms; improved means for setting pins through the pin pickup apparatus; a novel pin changing mechanism operable automatically to remove an entire complement of pins from the machine and replace them with another complete set of pins as is often required in bowling, as for example at the beginning of league or tournament play; and a novel compound program switch for causing each of the several mechanisms of a pinsetting machine to operate independently and in proper sequence.

Referring now to the drawings, the machine shown in Fig. 1 is arranged normally to operate through a two ball or "spare" cycle since this is the most common cycle utilized in the game of bowling. When a different cycle is required, as for example upon a strike or a foul first ball, the machine automatically conditions itself to perform the required one of these different cycles, as will be hereafter explained.

Fig. 1 shows in fragmentary form the basic mechanisms which consitute my improved machine. Such mechanisms comprise ball carrier apparatus shown in its raised position and designated generally at A in Fig. 1; pin elevating means shown in its lowered position and designated generally at B; a pin elevating hopper; pin delivery means designated generally at C; a pin arranging magazine designating generally at D; pin pickup and pinsetting mechanisms designated generally at E; guard and sweep apparatus designated generally at F; and pin changing apparatus designated generally at G.

In operating the preferred form of my improved pinsetting machine, a bowling ball 100 is rolled along a conventional alley bed 101 which is adapted to hold a set of bowling pins 102. At each side of the alley are gutters 103 and side walls or "kickbacks" 104, and behind the alley is a pit 105 into which said pins and ball may drop. Within the pit is a swinging pit cushion 106, which may be mounted in the usual manner. When the ball 100 is rolled down the alley bed it enters the pit, strikes the pit cushion 106, and rolls down the sloping floor of the pit provided by pin elevating apparatus to be hereafter described, onto the ball carrier A, which is shown in detail in Fig. 6. The ball carrier comprises a pair of rotatable rods 107 and 108 which extend transversely across the alley along the floor of the pit, and when the ball falls upon these rods the weight of the ball causes the machine to go into operation so that the ball carrier A moves upward, this operation being the same as that described in the above mentioned application. The rods 107 and 108 are slightly inclined toward one side of the alley so that the ball may be delivered to a ball return track 109 (Figs. 1, 5 and 6).

The rods 107 and 108 are fastened at each of their ends to elevating mechanism located on opposite sides of the pit. Since this mechanism is the same on both sides of the pit, the mechanism on one side only will be described. Thus at one end the rods 107 and 108 are fastened to a cradle 110, and this cradle is linked to upper and lower brackets 111 and 112 which are adapted by means of the respective attached rollers 111a and 112a to move along a vertical track 116. As shown in Figs. 4 and 6, a linking arm 113 pivotally connects the rear end of the cradle 110 to the upper bracket 111; a linking arm 114 pivotally connects the same end of the cradle 110 to a rear point on the lower bracket 112, said point being adjacent the track 116; and a linking arm 115 pivotally connects the front end of the cradle 110 to the forwardly extending end of the bracket 112 so that as the bracket 111 is pulled upwardly on its rollers 111a along the track 116 by means of a cable 117 (Fig. 6), the lower bracket 112 is also caused to move upwardly on its rollers 112a in the track 116, and a support is formed to carry the ball 100 upwardly and rearwardly on the rods 107 and 108 to the delivery position shown in broken lines in Fig. 6. Since the rods 107 and 108 are inclined the ball is caused to roll to one side of the alley where it falls onto the return track 109 to be returned to the players' end of the alley. The kickback 104 at one side of the alley prevents the ball from rolling off the ends of the rods before the ball is raised to the level of the return track. Bowling pins which have fallen into the pit 105 and onto the rods 107 and 108 may be dislodged as the rods travel upward by rotating the rods in the manner disclosed in the above mentioned copending application. As the ball carrier A reaches the limit of its upward travel, the machine operates through electrical or other means (not shown) to cause the pin pickup mechanism E (Figs. 1 and 10) to travel down and pick up any spare pins which are standing on the alley. The pin pickup mechanism E then moves upward to an intermediate position to allow the sweep mechanism F to clear fallen pins from the alley, these operations being described in detail in application Serial No. 657,238.

When the fallen pins are cleared from the alley and the sweep returns to its forward position, the machine operates through electrical or other means (not shown) to cause the pin elevating mechanism B in the pit to begin operation (Figs. 1, 7, 8 and 9), and also to cause the pin pickup apparatus E to return the spare pins to the alley bed, the action of this portion of the machine being described later in greater detail.

Figure 7:
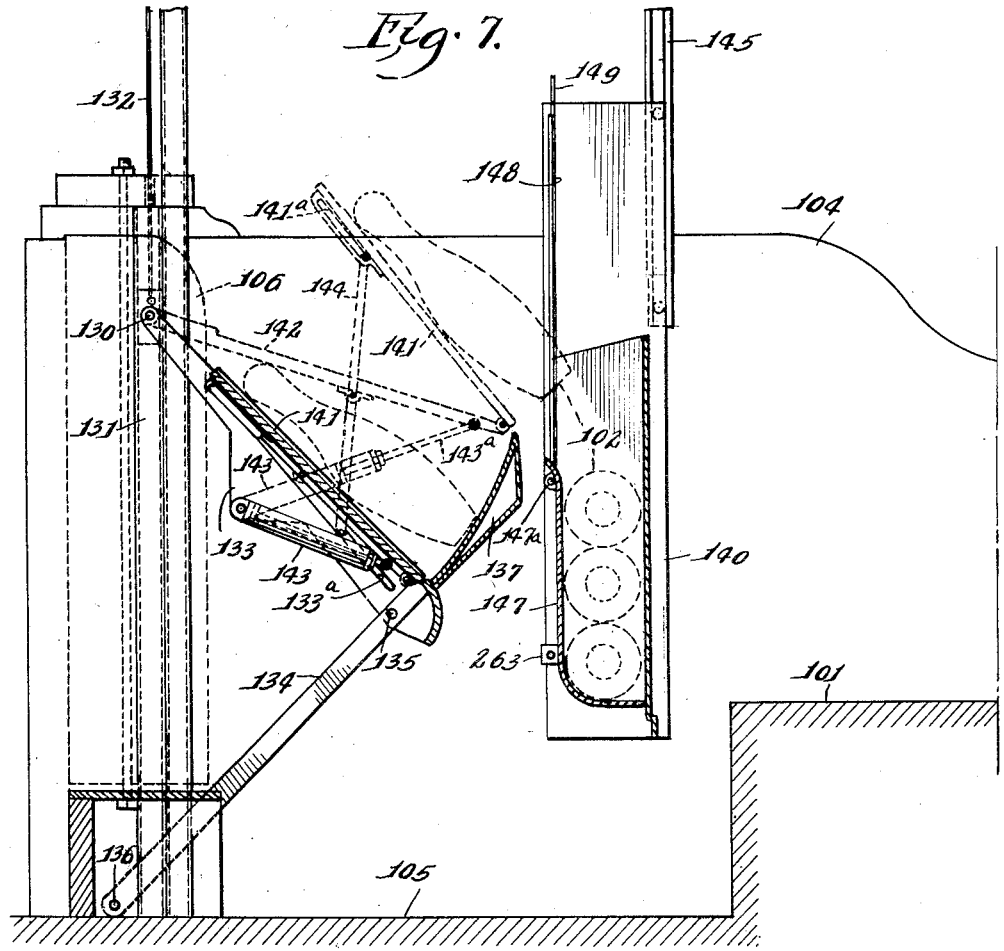
Fig. 7 is a longitudinal section through the pit of a bowling alley showing the pin handling mechanisms in the pit in raised position and the pin hopper in lowered position.

Figs. 1, 7, 8 and 9 show the action of the pin elevating mechanisms in the pit. As these mechanisms go into operation a roller 130 (Figs. 4, 7 and 8) is pulled upwardly along a track 131 by means of a cable 132, the roller 130 pivotally carrying an arm 133 so that said arm is elevated from the position of Fig. 8 to the position shown in Fig. 7. The arm 133 is pivotally attached to another arm 134 at point 135, the other end of the arm 134 being pivotally attached to a stationary portion of the bowling machine frame by the pin 136. As the roller 130 carrying the arm 133 is raised, a pit mat 141 and a forwardly extending member 137 (both of which extend transversely across the pit between the forward or right hand ends of the arms 134) form a V-shaped trough as best shown in Fig. 7, and within this trough pins are held ready for discharge into a pin hopper 140. This hopper is normally positioned above the pit as shown in Fig. 1, and moves downwardly along a track 145 to the position shown in Fig. 7 as the previously described pin elevating structure is raised from the bottom of the pit to the position shown in Fig. 7.

Figure 8:
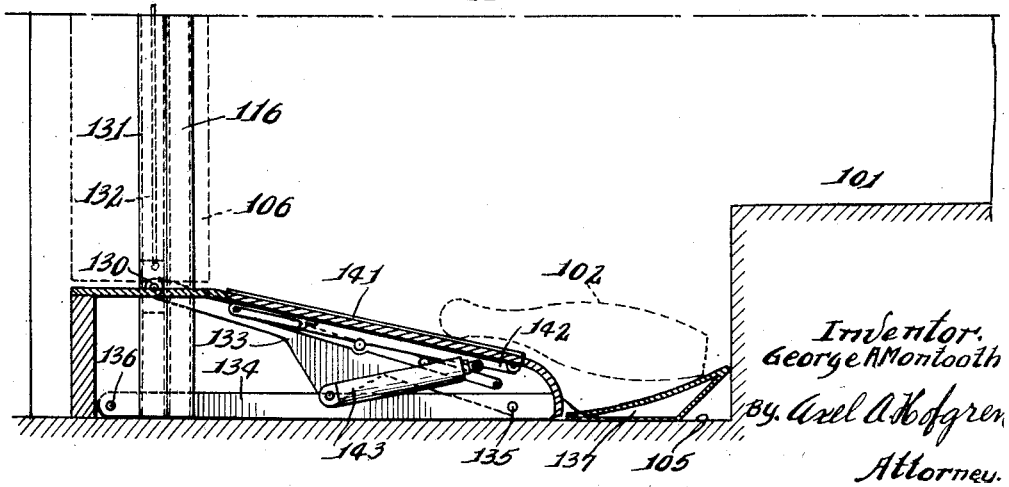
Fig. 8 is a longitudinal section through the pit of a bowling alley showing the pin handling mechanisms in lowered position on the floor of said pit.

When the hopper 140 is in the position of Fig. 7 the pit mat 141 which extends across the pit and is carried by pairs of arms 142 and 144 in scissor-like arrangement, and which normally forms the sloping floor of the pit, is raised by means of a hydraulic piston and cylinder device 143, which is carried by the arm 133. Each arm 144 is pivotally and slidably connected at one end to a rear portion of the pit mat in a slot 141a, is pivotally and slidably connected at its other end to the arm 133 in a slot 133a, and is pivotally connected adjacent its mid point to an intermediate point on the arm 142, this latter arm being pivotally connected at its front end to the front portion of the pit mat 141, and being pivotally connected at its rear end to a bracket carried by the roller 130. Piston rod 143a of the hydraulic device 143 is attached to the arm 142 at a point adjacent the attachment of the pit mat to said arm, so that as the piston moves forwardly (to the right in Fig. 7) within the cylinder 143 the arm 142 is caused to pivot around its rear point of connection with the roller 130, the front end of said arm 142 being raised to the position shown in broken lines in Fig. 7, and the scissor-like arrangement of the arms 142 and 144 causing the pit mat to be raised above the forwardly extending end of the member 137 to discharge the pins 102 into the pin hopper 140. The hopper is then pulled upwardly along its track 145 by means of a cable 149 and a pulley 150 to its top position shown in Fig. 9, and at the end of its upward travel electrical or other means (not shown) are actuated to cause the pin elevating mechanism B and the ball carrier A to reverse their actions and return to their bottom positions on the pit floor (Figs. 6 and 8).

As this action occurs, the sweep and guard apparatus F (Fig. 1) are caused to be lifted to their top position so that the alley is cleared for the second ball to be thrown by the bowler. The action of the sweep and guard may be the same as described in the earlier application above referred to and will not be explained in detail here.

As appears from the above description and drawings, the ball carrier A and the pin removing mechanisms B are completely contained within the normal confines of a conventional alley and pit and forwardly of the normal position of the pit cushion 106, allowing my machine to be installed in a conventional bowling alley without changing any structure found in such alley. Furthermore, these mechanisms are so arranged in the pit, and the other pin handling mechanisms to be hereafter described are so arranged that the pit and the space above the pit are free of all parts of the machine, leaving room for a pin boy to work if it is desired to set pins manually.

The hopper 140 is stopped at its upper limit of travel by a stop 146 (Figs. 1, 9 and 11) which may include a switch or other means to actuate the succeeding operations of the machine. When the body portion of the hopper 140 strikes the stop 146 its upward motion is arrested, but a movable bottom 147 within the hopper continues slowly upward along a track 148 on the body portion of the hopper, this movement as well as the raising of the hopper body being accomplished by means of the cable 149 and the pulley 150 so that pins are dispelled from the hopper onto a sloping receiving board 151 (Figs. 1, 9 and 11).

Figure 2:
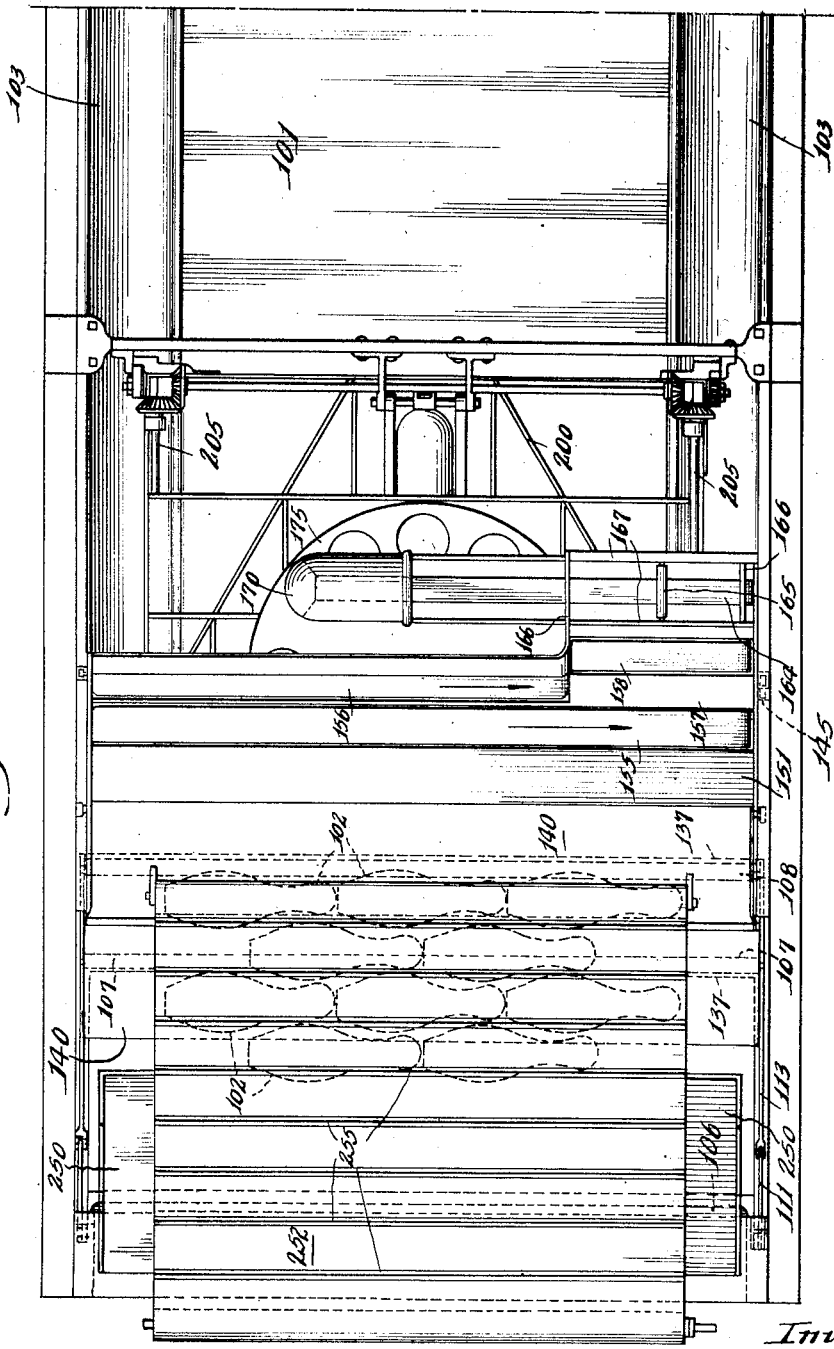
Fig. 2 is a plan view of the apparatus shown in Fig. 1.

As indicated in Fig. 9, the rather slow upward movement of the bottom 147 causes the pins to string out in a line rather than to fall in one group upon the receiving board 151, and the slope of the receiving board causes the pins to roll into a V-shaped trough formed by two traveling belts 155 and 156 which are angularly placed as shown in Fig. 9 and carry the pins transversely across the alley as shown in Figs. 2 and 3. Since belt 155 extends entirely across the alley 101, while belt 156 terinates short of one side of the alley by a distance slightly greater than the length of a bowling pin, the pins are caused to roll down an inclined board 157 onto a pin lifting shelf 158 when said shelf is in its lower position shown in broken lines in Fig. 9. During the operation of the machine the lifting shelf 158 continually travels up and down between upper and lower terminal positions indicated in Fig. 9, and is moved by a crank pin 162 on a disc 159 and a curved connecting arm 160 which is pivotally connected at its forward end to the bowling machine frame at 161. Adjacent the center of the arm 160 is a slot 160b, and said arm is pivotally and slidably secured to the disc 159 by means of the crank pin 162 positioned eccentrically on said disc, the other or rearwardly extending end of the arm 160 being curved downwardly as shown in Fig. 9 and carrying the lifting shelf 158 thereon. The lifting shelf 158 is of sufficient length and width to hold only one pin, and said shelf travels downwardly below the level of the inclined board 157 only a sufficient distance to receive one pin at a time, so that the pins are separated and are delivered singly to the pin arranging magazine D.

As the lifting shelf 158 travels upwardly, the pin which is being carried thereon slides along a curved panel 163 until the shelf approaches the top of its travel. At this time, the shelf 158 is in an inclined position as shown in Fig. 9, and the pin carried by said shelf is above the level of said panel 163, so that the pin rolls off the shelf and falls down onto a traveling belt 164 which also runs transversely across the alley as shown in Figs. 2 and 3. In its passage from the lifting shelf 158 to the traveling belt 164 the pin falls onto a roller 165 which is located in the exact center of the pin being discharged and between a pair of parallel boards 167 which are spaced apart a distance only slightly greater than the width of a bowling pin. Consequently, the heavy or butt end of the pin always falls first, as the pin falls through the passageway formed by the parallel boards 167 and another pair of end boards 166, and the pin is carried butt end first along the belt 164 transversely across the alley and deposited into a pin arranging magazine D through a chute 170 (Figs. 2, 3 and 9).

The pin arranging magazine which is indicated generally at D in Fig. 1 and is also shown in Figs. 2, 3, 5 and 10, is described fully in the aforementioned application Serial No. 657,238 and therefore will be described but briefly here. In the machine described in the aforementioned application, this magazine was located over the pit, while in my improved structure which is the subject matter of this application, the magazine is located over the pin deck at the rear of the alley bed so that the pins may be moved vertically from the pin arranging magazine D onto their proper spots on the alley bed, this doing away with the necessity of moving the pins forwardly from the pit to a position above the pin spots on the alley bed after said pins have been arranged in their proper relative positions.

The pin arranging magazine D comprises a frame formed of a top circular disk 175 (Figs. 1 and 10) and a somewhat similar bottom disk 176 connected by a spacing tube 176a (Fig. 3), the frame formed by these two disks being preferably mounted in anti-friction bearings (not shown) for rotation on a vertical shaft 177 (Fig. 10). A third circular disk 178 is disposed below the disk 176, this third circular disk also being mounted for rotation on the shaft 177 by means of anti-friction bearings (not shown).

In the space between the disks 175 and 176 there are provided ten tubes 179, each of a size to allow a bowling pin to pass therethrough. Six of these tubes are vertical and have a respective circular arrangement corresponding to the conventional numbers 2, 3, 4, 6, 8 and 9 pin spots on an alley bed, and these six tubes are fixedly mounted between the disks 175 and 176. The four other tubes have their upper ends in the same circle on the disk 175, but are each arranged to swing on a horizontal pivot in the disk 175 so that their lower ends can be directed toward the numbers 1, 5, 7 and 10 pin spots respectively. Openings are provided in the disk 175 so that the pins being received from the chute 170 may fall successively into the tubes 179 as the pin arranging magazine rotates, and spring and latch means (not shown) are provided for intermittently rotating the magazine frame as a pin enters a tube 179 as fully described in the above mentioned Montooth and Bowen application. While the tubes 179 are being filled, one pin to each tube, the pins within the tubes rest upon the disk 178, and when all ten tubes 179 contain a pin, the disk 178 is caused to rotate with respect to the disks 175 and 176 so that holes in disk 178 are in register with the bottoms of the tubes 179, and the pins drop through said openings in the disk 178 into pin tubes 185 (Fig. 10) which are supported from a rack 186 by means of latches not shown here but which are shown and fully described in Montooth and Bowen application Serial No. 657,238 above referred to.

After a second bowling ball has been rolled, the machine again is caused to operate in a manner above described. The ball is lifted and deposited upon return track 109 by means of the ball carrier A, and then the alley is cleared of all the remaining pins, both standing and fallen. When the alley sweep apparatus F returns to its forward position after sweeping the pins into the pit, the pin elevating mechanism in the pit operates to deliver the remaining pins to the pin arranging magazine D, and the pin pickup apparatus E first moves downwardly. This time, however, the pin tubes 185 are unlatched from the supporting member 186 and are carried by the pin pickup apparatus down to the alley to deliver a new set of pins thereto.

The pin pickup apparatus is movable between the upper position shown in solid lines in Fig. 10 and the lower position shown in broken lines in said figure. Portions of this pickup structure are shown in detail in Figs. 12–16. The pinsetting and pickup mechanism comprises a generally triangular frame 200 (Figs. 2 and 3) which is adapted to move in a vertical direction and is carried on an interconnected shaft and pinion mechanism 205 and 206 which rides on vertical racks 201 and 202 (Figs. 1 and 10), vertical movement being imparted to this apparatus by means of hydraulic piston and cylinder devices 203 and 204 which are affixed to the machine framework as shown in Fig. 5 and carry the frame 200, reference being had to the above mentioned application Serial No. 657,238 for a complete description of the hydraulic apparatus which operates these mechanisms. The interconnected shaft and pinion mechanism 205 and 206 acts in cooperation with the racks 201 and 202 to maintain all portions of the frame 200 level at all times in the manner described in the aforementioned Montooth and Bowen application.

Figure 14:
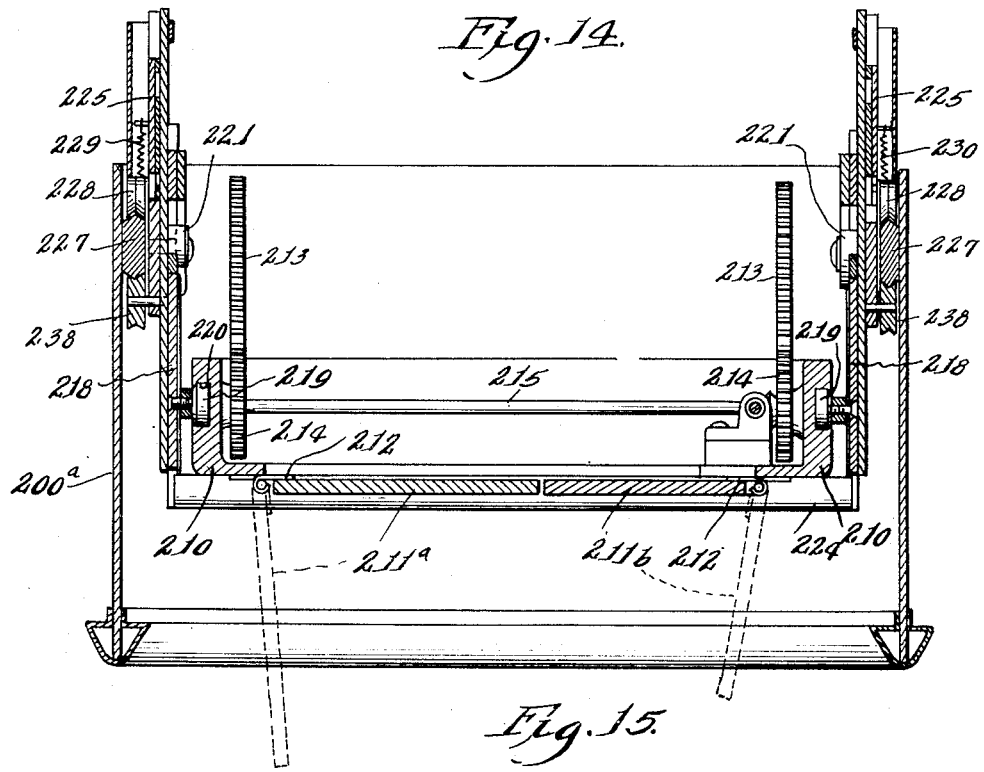
Fig. 14 is a section through one of the pin pickup units taken at right angles to Fig. 12.
Figure 16:
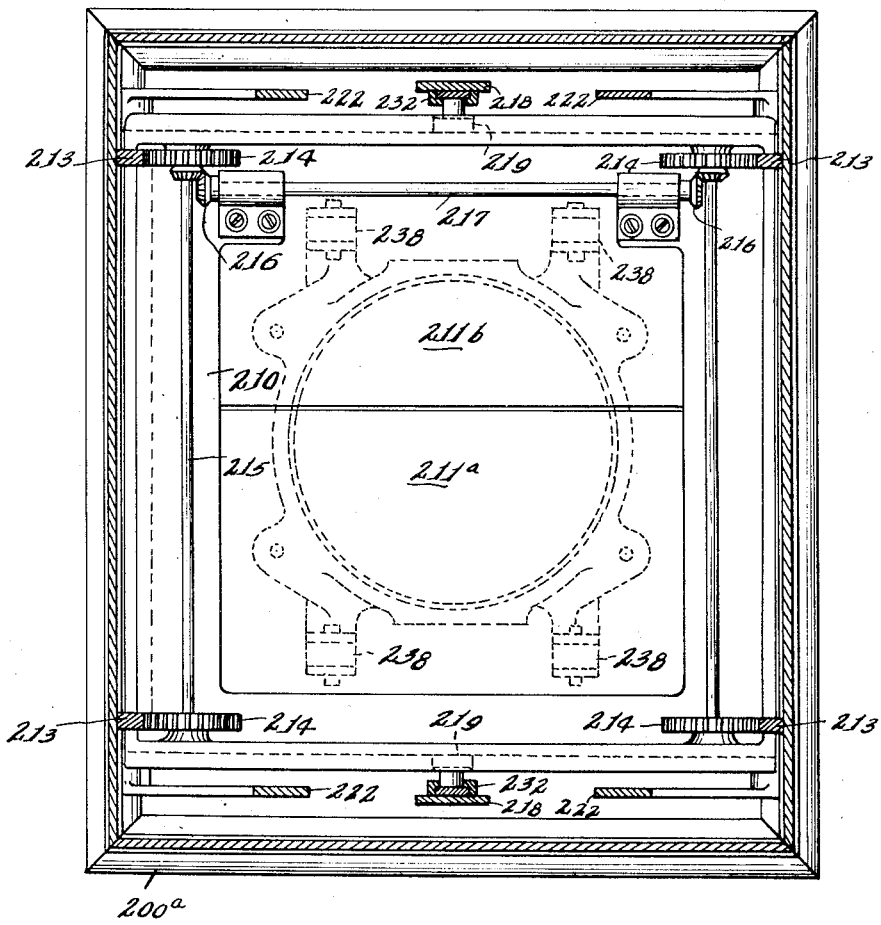
Fig. 16 is a horizontal section through one of the pickup units taken on the line 16—16 of Fig. 12.

The frame 200 is divided into ten sections, these sections being arranged in a triangular pattern so that each section corresponds with and is directly above a pin spot on the alley bed. These ten sections are fundamentally the same as those described in the Montooth and Bowen application above referred to, except that the center vertical shaft shown in said application has been omitted and means are provided to set a pin through each of these sections. In Figs. 12, 14 and 16 one of the pin pickup sections is shown in detail, it being understood that each of the other sections is similar in construction.

Each of the pin pickup units comprises independent mechanisms consisting of a vertically movable mechanism and a horizontally movable lifting and holding carriage to be hereafter described.

Referring to Figs. 12, 14 and 16, each vertically moving mechanism includes a rectangular frame 200a which is carried by the triangular frame 200, and within the confines of which the pin pickup mechanisms are located. These mechanisms include a horizontal plate 210 having a central cut out portion within which is pivotally mounted a trap door 211 comprising two sections 211a and 211b. These sections are preferably of unequal size so that the dividing or opening line between them is off center in order that the pressure which is exerted when the members 211a and 211b contact the top of a standing pin is not exerted exactly at the dividing line between the sections 211a and 211b when the pin is on or adjacent its normal position on the alley bed, which is usually the case. This trap door 211 is biased to normal closed position as is shown in solid lines in Fig. 14 by means of springs 212, and the trap door is adapted to be opened downwardly as shown in dotted lines in said figure, but not to be swung upwardly above the horizontal position shown. When the frame 200 which carries the ten individual pin handling supports or frames 200a moves downwardly, spare pins are engaged by the respective trap doors and are clamped in their positions on the alley bed. As these spare pins are engaged the downward movement of the respective plates 210 which carry the trap doors is stopped, while the hydraulic mechanisms 203 and 204 cause the frame 200 with its ten subsidiary frames 200a to continue to move down, so that a relative movement occurs between the plate 210 and the support 200a, said plate moving along gear racks 213 by means of gears 214, the gear racks being attached to the frame 200a, and the gears being attached to the plate 210 by shafts 215 and interconnected by bevel gears 216 and shafting 217 in order to maintain the plate 210 in horizontal position regardless of where the pressure is exerted by the bowling pin in the event the pin is off its normal spot.

As the plate 210 travels upwardly with respect to the support 200a along the racks 213, push bars 218 which are attached to the plate 210 by means of rollers 219 which fit into a track 220 (Fig. 14), are pushed upwardly, thrusting rollers 221 against arms 222.

These arms are carried by the supporting framework 200a, being pivoted thereon at 223, so that the action of the rollers 221 against the arms 222 causes said arms to pivot with a scissor-like action so that parallel bars 224 which are attached to the lower ends of the arms 222 are caused to close and grip the neck of the pin which has been clamped to the alley bed by the trap door 211. As the relative movement between the plate 210 and the support 200a continues a latch 225 engages a catch 226, thus holding the push bars 218 in an elevated position and causing the parallel bars 224 to grip firmly the neck of the clamped pin. When this gripping action is completed, the frame 200 which carries the pin handling units is raised, and all spare pins are lifted from the alley bed. When the frame 200 again moves down to reset the pins on the alley bed, pressure is again exerted on each plate 210 as the respective pins contact the alley bed. This pressure causes latch 225 to become unlatched and allows the parallel bars 224 to spread so that the pin is left standing on the alley in the exact position from which it was picked up. The structure and operation of the latch and catch mechanism 225 and 226 is disclosed fully in the copending application above referred to.

This vertically moving pin lifting mechanism is horizontally movably mounted on tracks 227 which are carried by supporting frame 200a (Figs. 12 and 14) by sheaves 228 so that the whole vertically movable carriage may be shifted horizontally if the bars 224 contact the neck of a pin which has been knocked off its normal spot on the alley bed. Consequently, any such off spot pin which is still within the confines of the range of movement of an individual unit will be picked up and replaced on the exact spot from which it was picked up. Springs 229 and 230 are provided to move the parallel bars 224 away from the neck of the pin as soon as the latch 225 is released, and a slide bar 231 which is telescopically carried on the push bar 218 in guides 232 is provided to allow the plate 210 to continue its relative movement with reference to the supporting frame 200a so that the pin is held firmly while the mechanism is latched.

Figure 15:
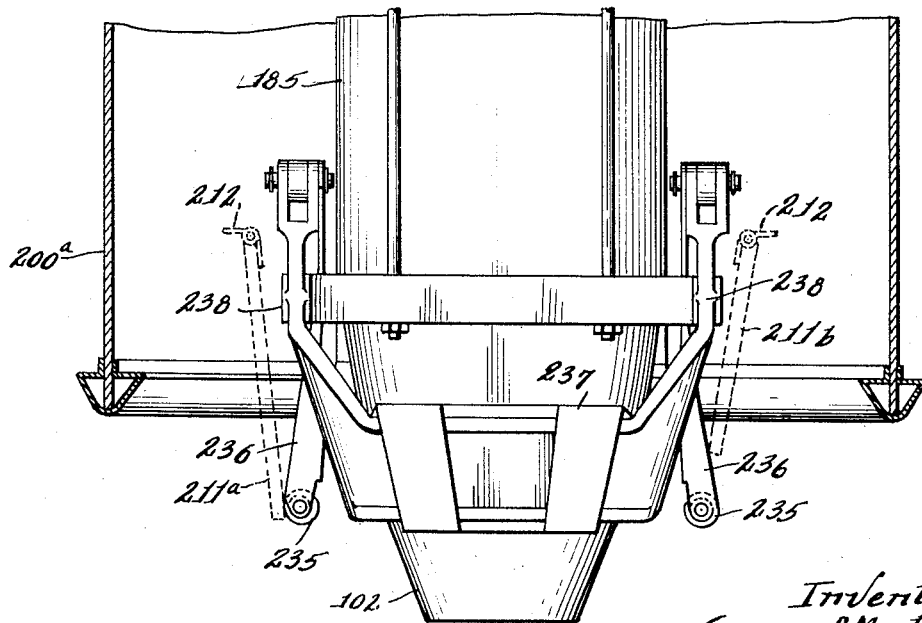
Fig. 15 is a section through one of the pinsetting units taken at right angles to Fig. 13.

An important feature of my improved machine is a provision whereby pins may be set on the alley at the beginning of each frame by movement down through each of the above described pin pickup units, the trap doors 211 being provided for this purpose. When the frame 200 rises to its top position after the second ball has been thrown the pin tubes 185 become unlatched from the supporting member 186 and are supported by the frame 200 by means of latches described in application Serial No. 657,238, and said pin tubes are carried with said frame down to the alley to deliver a set of pins thereto, each pin tube extending down through one of the pickup mechanisms and the rollers 235 which are attached to the pin tubes by means of bars 236 pushing open one of the trap doors 211. When the frame 200 approaches its bottom position the base of each of the bowling pins comes to rest on a pin spot on the alley bed. When the outward pressure exerted by the weight of the bowling pin against holding shoes 237 is relaxed, due to the pin resting on the alley bed, spring 240A which is pressing downwardly on link 240, forces links 240 and 239 downwardly. Pin 241, which pivotally connects links 239 and 240 slides down along slot 236a until it reaches the bottom of said slot. Obviously as the pivot 241 travels downwardly links 239 and 240, being pivotally connected to holding shoe arms 237A, cause the upper ends of holding shoe arms 237A to be drawn together and holding shoes 237 to spread apart thus releasing the pin. As shown in Figs. 13 and 15 the shoes 237 are pivotally affixed to the pin tubes 185 by means of screws 238. The frame 200 then carries the pin tubes 185 to the top position, leaving the pins properly spotted on the alley. As the frame 200 approaches the top position, the pin tubes 185 are again latched to the supporting member 186. A rod 242 extends vertically from its pivotal mounting on an extending portion 240b of the link 240 (Fig. 13), the upper portion of said rod being slidably enclosed in a tube 243 and engaging the end of a compression spring 244 within the tube. As the top of this tube 243 contacts supporting member 186 onto which the pin tubes 185 are latched, the spring 244 is compressed, exerting pressure on the rod 242. This pressure is transmitted by the link 240 and acts to return the gripping shoes 237 to their closed position. As is shown in Fig. 13 pin 241 is forced upwardly to a position above a line extending between the centers of pins 237B and is held there by the downward pressure of rod 242 until another pin is dropped into position between holding shoes 237. As frame 200 again moves downwardly, pressure on spring 244 is relaxed and pin 241 is held in its top position by the outward pressure exerted by the bowling pin pressing against holding shoes 237. This condition exists until the bowling pin contacts the alley bed and pressure is relaxed thus allowing spring 240A to force pin 241 down past the line extending between the centers of pins 237B to release the pin on the alley bed.

In a bowling alley it is general practice for the management to supply to the bowlers various sets of pins depending upon the type of play in progress. Thus, leagues and tournaments are most often furnished with new pins, while in open play, match games, etc., older or other pins are used. Consequently, it is desirable that automatic means be provided for quickly changing the complement of pins in an automatic pinsetting machine. Such an automatic pin changing means is provided in my improved pinsetting machine, this pin changing means being shown generally in Figs. 1 and 2, and in greater detail in Fig. 11.

The pin changing mechanism comprises two major units in addition to portions of the machine already described, these being a discharge chute 250 and a reloading conveyor indicated generally at 251, the incoming set of pins being manually placed on this conveyor prior to the time the pins are to be changed. The conveyor consists of an endless belt 252 trained over pulleys 253 and 254 which rotate with shafts supported on the main machine frame. The belt 252 is located above the pit and slopes slightly to the rear as shown in Figs. 1 and 11. Said belt is of sufficient width to accommodate three bowling pins laid end to end along a plurality of slats 255 (Fig. 2) which are fixedly secured to the belt in such manner that there may be eight rows of pins on the belt. The pins may be placed on the belt in alternate end-to-end rows of two and three, so that there are three pins laying end-to-end in the first row, two in the second row, three in the third row and so on, as shown in Fig. 2. Thus the first four rows on the belt 252 carry ten pins and the next four rows carry ten more pins. This is necessary since the machine is designed to carry a full complement of twenty pins.

In the event the pin changing mechanism is actuated, the hopper 140 comes to its pin discharging position as shown in Fig. 11 and two hydraulic piston and cylinder devices 256 and 257 operate the pin changing mechanism. Cylinder 256 is fastened to the main machine frame, and its piston rod 256a is connected with an endless cable 258 which is trained over an idler pulley 259 and a ratchet pulley 260, said ratchet pulley being mounted on the shaft of pulley 254 by means of a ratchet connection so that as the hydraulic mechanism operates to drive the piston rod 256a out of the cylinder 256, the conveyor belt 252 is caused to travel forwardly (clockwise in Fig. 11) a distance sufficient to discharge the first four rows of pins into the pin arranging mechanism. Then as the hydraulic piston and cylinder device drives the piston rod 256a back into the cylinder 256, the ratchet connection of the pulley 260 allows the cable 258 to return to its starting position without changing the position of the conveyor belt 252, and the second four rows of pins are left in place on the conveyor belt ready to be discharged into the machine on the next operation. A hand crank 253a is provided on the shaft of pulley 253, which crank may be operated to move the conveyor belt 252 when said belt is being loaded with pins.

A flap 261 is provided so that incoming pins can cross over the hopper 140 and roll onto the receiving board 151, this flap being loosely mounted on the shaft of pulley 260 and being held in its elevated or broken line position of Fig. 11 by a spring 262. As the conveyor belt 252 moves forward with its load of pins, the weight of the pins causes the flap 261 to drop down to the position shown in solid lines in Fig. 11 so that it spans the hopper 140, the flap 261 being held in this position by the spring 262 so that it remains down until all pins are discharged from the conveyor. When the machine goes back into normal operation and the bottom 147 of the hopper moves up along its track 148 to discharge pins into the pin arranging mechanism, the upper edge of the bottom 147 will throw the flap 261 back into its raised position where it is held by the spring 262 until the next pin changing operation.

In the normal operation of the machine when the pin changing mechanism is not actuated, the hopper 140 travels upward to its top position shown in Figs. 9 and 11 and then the bottom 147 in the hopper continues to travel up along the track 148, discharging pins from the hopper onto the receiving board 151. However, when the pin changing mechanism is in operation, the hopper 140 does not travel to its top position against stop 146, but is caused to stop at the position shown in broken lines in Fig. 11. This stopping action is caused by de-energization of driving pulley 150, therefore bottom 147 remains in its bottom position and pins are not forced out of the top of hopper 140.

With the hopper in this discharging position the hydraulic piston and cylinder device 257, which is mounted on the main machine frame at 257b, goes into action, the piston rod 257a of this device moving out of the cylinder 257 and rotating a three pronged trip arm 264 about its shaft 265. One prong of this trip arm 264 engages a stop 250a on the discharge chute 250, and as this prong of the trip arm rotates in a counterclockwise direction, the discharge chute 250 is lowered by gravity from its out of the way position shown in broken lines to the position shown in solid lines in Fig. 11 where it is in alignment with the hopper 140. The pivotal mounting of the discharge chute on the main machine frame at 250b allows this movement between operating and out of the way positions. Another prong of the trip arm 264 engages a catch 263 on the hopper bottom 147. This bottom is pivotally mounted on the hopper body at 147a so that rotation of the member 264 unlatches the catch 263 and lifts the hopper bottom in the manner shown in Fig. 11 so that the pins within the hopper 140 fall through the bottom of said hopper and into the chute 250 through which they are discharged into a basket 266 or other means which are provided back of the pit to receive the outgoing pins. The hopper bottom 147, due to its pivotal mounting 147a, constitutes a pin changing door which allows pins to pass into discharge chute 250 when said door is opened.

The complete series of operations which occur when the pin changing mechanism is actuated in the bowling machine described herein must, of course, include operations to remove the pins which are presently in the machine. Therefore, in order to completely change the twenty pins which are carried by the machine, when the pin changing mechanism is actuated, the ball carrier A (Fig. 1) first rises to deposit the ball on the return track, the sweep F clears the alley of standing and fallen pins and returns to its front position; the pin elevating mechanism B on the floor of the pit rises and delivers pins to the hopper 140, which has lowered from its top position to the position of Fig. 7; and the pinsetting apparatus E over the alley first descends and then goes up to release the pin tubes 185; the hopper 140 rises to its discharge position shown in broken lines in Fig. 11; pinsetting mechanism E lowers and places a different set of pins on the alley; the discharge chute 250 lowers and the hopper bottom is opened, allowing the pins within the hopper to fall through the chute 250 and into the basket 266, thus removing ten pins from the machine. The reloading conveyor belt 252 now moves forward and delivers ten incoming pins to the pin arranging mechanism from where they are arranged in the pin tubes 185. The hydraulic piston in the cylinder 256 returns to its starting position, the ratchet pulley 260 preventing the belt 252 from backing up; the discharge chute 250 rises, the hopper bottom 147 closes and the pin elevating mechanism B returns to the floor of the pit. Since the machine normally carries twenty pins, the sweep F again clears the alley and the above series of operations is repeated, after which the ball lift A returns to its bottom position in the pit and the other devices return to their normal operating positions. Thus, the only manual operation required in changing a complete complement of pins is the initial placing of the pins on the reloading conveyor belt 252, and this operation may be performed before the alleys are open to bowling or during the course of play so that the pins may be automatically changed and a new complement of pins placed in the machine in a very short time.

Figure 19:
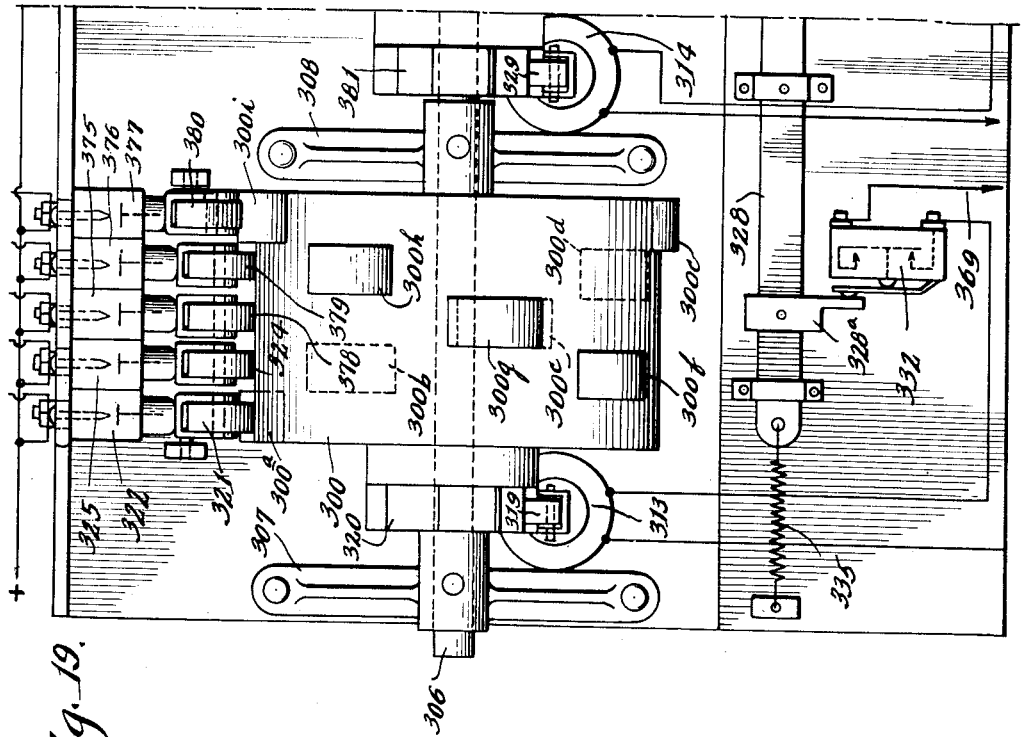
Fig. 19 is an enlarged view of one of the sections of the program switch shown in Fig. 17.
Figure 18:
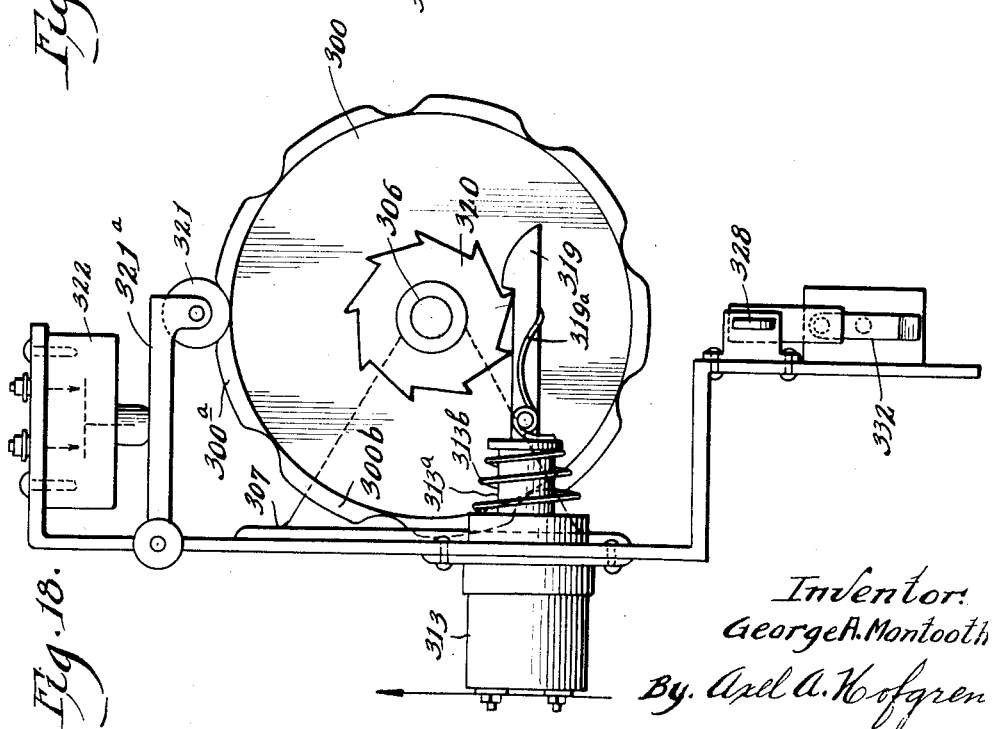
Fig. 18 is an enlarged end view of the switch shown in Fig. 17, looking from the left of Fig. 17 and showing the operating mechanism for one of the sections of the program switch.

The series of operations performed during the normal cycles of the automatic pinsetting machine and the automatic pin changing operations above described may be controlled by a compound program switch such as is shown in Figs. 17, 18 and 19.

In the automatic pinsetting machine disclosed in this application and in the earlier Montooth and Bowen application above referred to, several separate cycles of operation are required. Three of these cycles are fully automatic, namely, spare or two ball cycle, strike cycle, and the cycle required when a gutter ball is thrown on the first ball so that it is not necessary to pick up the pins and sweep the alley. Other desired cycles of operation may occur when the machine is operating, as when the bowler commits a foul on the first ball so that any pins knocked down must be reset to provide a full complement of ten pins before the second ball is rolled; and a cycle whereby the machine removes the pins from the alley and acts only to return the ball when it is rolled in order to provide free or warm-up shots by the bowler. I have provided a compound program switch which will completely control the operation of the machine, the foul, free ball and automatic pin changing cycles of operation being initiated by a manual operation, as for example, a push button rather than by an automatic operation since there is no predetermined time in a bowling game when these cycles may be required.

Such a compound switch capable of operating one machine through the six cycles set forth above is shown in Fig. 17, this switch comprising a plurality of cylinders 300, 301, 302, 303, 304 and 305 rotatably mounted on a stationary shaft 306 which is held in place by bearing hangers 307, 308, 309, 310, 311 and 312. Each of the respective cylinders is caused to rotate around the shaft 306 in steps of less than one revolution by the respective solenoids 313, 314, 315, 316, 317 and 318. Since the operation of each of these cylinders is fundamentally the same, although each cylinder may be called upon to cause a different result, only cylinder 300 will be described in detail. When solenoid 313 is energized, its associated magnetic core 313a moves into the solenoid (moves to the left in Fig. 18) and pulls with it a catch bar 319 which is pivotally attached to said core, turning ratchet 320 one step in a clockwise direction, and the cylinder 300 on which the ratchet 320 is mounted rotates through one space. De-energization of the solenoid 313 allows a spring 313b to return the magnet core 313a to the position shown in Fig. 18 ready for the next operation, and since the catch 319 is pivotally carried on the core 313a, said catch slides over the teeth of the ratchet 320 on the return stroke, said catch being held against the ratchet teeth by means of a spring 319a.

Thus, each time an electrical contact is made to energize the solenoid 313, the cylinder 300 is turned one space until said cylinder has turned the specific number of spaces required to carry out the complete program of the machine for the particular cycle of operation which cylinder 300 is designed to control. In the apparatus shown in Fig. 17, cylinders 300, 303, 304 and 305 are each designed to turn 360 degrees to carry out one complete program, while cylinders 301 and 302 are each designed to turn 180 degrees to carry out one complete program. When the ball carrier A reaches its top position means are provided to cause contact to be made through a switch or other conventional means (not shown) associated with the ball carrier to energize hydraulic cylinders 203, 204 to cause pin pick-up and search unit E to descend to search for pins. At this point it is determined which of the 3 cycles the machine is to follow, i. e., if no pins are found standing contact is made through the ten pickup units which energizes solenoid 326 to shift the control from the program cylinder 300 to the program cylinder 301 which causes the machine to follow its strike cycle of operation. Likewise, if all pins are found standing contact is made through the ten pickup units which energizes solenoid 400 to shift the control from the program cylinder 300 to the program cylinder 302 which causes the machine to follow its gutter ball cycle. However, if some, but less than ten pins are found standing, no contact is made and the machine remains in its normal or spare cycle and is controlled by cylinder 300 of the program switch.

When the pickup and search unit E reaches its bottom position contact is made through a switch or other conventional means (not shown) associated with said pickup and search unit to energize one of the three solenoids 313, 314, or 315 depending upon which of the three above mentioned cycles is selected. In the event that the program for normal or spare cycle is selected the operation continues as follows: Cylinder 300 is turned one space and a roller 321 which is carried by a pivotally mounted actuating arm 321a (Fig. 18) rolls over a raised actuating portion 300a on the periphery of the cylinder 300, so that the actuating arm 321a closes a switch 322, which may be a microswitch of conventional type, and which is connected to means utilized to operate the alley sweep through a lead 323 (Fig. 17). As the alley sweep completes its operation and returns to its forward position, contact is made through a switch or other means (not shown) associated with said sweep, again to energize the solenoid 313 to move the cylinder 300 another space. Roller 324 rolls over another raised actuating portion 300b on the periphery of the cylinder 300, making contact through switch 325 which is connected through lead 340 to actuate means utilized to elevate the pin elevating mechanism B in the pit, to lower the pin hopper 140, and to operate the pin setting apparatus E. As the pin hopper reaches its bottom position, contact is made through another switch (not shown) to energize the solenoid 313 again, turning the cylinder 300 another step, and so on until the entire spare or normal two ball cycle is completed, there being nine notches on the ratchet 320, nine raised actuating portions 300a—300i on the cylinder 300, five switches 322, 325, 375, 376 and 377, and five actuating rollers 321, 324, 378, 379 and 380 associated with the cylinder 300.

In the event a strike is made on the first ball, a signal is sent by the pinsetting apparatus E in the manner disclosed in the above mentioned Montooth and Bowen application when said pinsetting apparatus finds no spare pins standing on the alley so that the solenoid 326 (Fig. 17) is energized. A magnetic core 326a associated with this solenoid 326 is connected with a carriage 327, so that when the solenoid 326 is energized the carriage 327 is moved to the right in Fig. 17, said carriage carrying with it a slide bar 328, and a latch 329 on said carriage engaging a disk 330. By this action, a normally open microswitch 331 which is in series with solenoid 314 is closed, and another normally closed microswitch 332, which is in series in the lead 369 controlling solenoid 313, is opened by respective contactors 327a on the carriage 327 and 328a on the bar 328. It will be seen from Fig. 17 that the action of the switches 331 and 332 takes the control of the machine away from the cylinder 300 and vests it in the cylinder 301 so that cylinder 301 controls the operation of the machine until the strike cycle is completed. As cylinder 301 turns, the disk 330 turns with it, and the latch 329 slides along the edge of this disk until said latch engages a shutter door 333 which is closed over the notch 334 in the disk 330. The shutter door then slides open, allowing the latch 329 to slide through notch 334 in the disk 330, and the slide bar 328 is urged by a spring 335 to return to its original position, contactors 328a and 327a, respectively, closing switch 332 and opening switch 331 so that the machine is now in its normal operating position and is under the control of the cylinder 300.

Cylinder 301 has associated with it a ratchet 381 having ten notches thereon, and cylinder 301 has ten actuating portions 301a–301j on its periphery, there being five microswitches 382, 383, 384, 385 and 386 and five actuating rollers 387, 388, 389, 390 and 391 associated therewith.

Each of the other cylinders of the program switch is provided with a similar carriage mounted on the bar 328, as the carriages 392, 393, 394 and 395 each having a contactor 392a, 393a, 394a and 395a, and each carrying a similar latch mechanism 396, 397, 398 and 399. Solenoids 400, 401, 402 and 403, having cores 400a, 401a, 402a and 403a adapted to actuate respective microswitches 404, 405, 406 and 407 are also provided in association with the cylinders. Consequently, any cylinder may be engaged to control the various cycles, and at the completion of each cycle the slide bar 328 moves back to its normal position wherein switch 332 is closed and cylinder 300 controls the operation of the machine. A slot 336 is provided in the carriage 327 and associated with cylinder 301, and similar slots 408, 409, 410 and 411 are provided and associated with each of the other carriages the slot and pin connection between the slide bar 328 and the respective carriages providing that any one of the respective carriages and latches may be actuated without affecting the others since movement of any carriage to the right will carry the slide bar 328, but upon movement of the slide bar the pin will move in the respective slots of each other carriage.

Cylinder 302 has associated with it a ratchet 412 having ten notches thereon, and cylinder 302 has ten actuating portions 302a—302j on its periphery, there being four microswitches 413, 414, 415 and 416 and four actuating rollers 417, 418, 419 and 420 associated therewith. Cylinder 303 has associated with it a ratchet 421 having ten notches thereon, and cylinder 303 has ten actuating portions 303a—303j on its periphery there being five microswitches 422—426 and five actuating rollers 427—431 associated therewith. Similarly cylinders 304 and 305 have respective ratchets 432 and 433 associated therewith, each said cylinder having eleven raised actuating portions 304a—304k and 305a—305k on their peripheries, there being five microswitches 434—438 and five actuating rollers 439—443 associated with cylinder 304 and six microswitches 444—449 and six actuating rollers 450—455 associated with cylinder 305.

While it will be obvious that any number of cycles may be controlled and that each cycle may consist of different steps, I have provided the hereinafter described arrangement to control the operation of the machine disclosed herein.

Cylinder 300 controls the operation of the machine on the first ball of a normal two ball or spare cycle, the lead 323 controlling the alley sweep apparatus; lead 340 controlling the pin elevating mechanism in the pit in the up direction only, and the pin hopper 140 in the down direction only; lead 341 controlling the pit mat 141 in the up direction only; lead 342 controlling the pin hopper 140 in the up direction only; and lead 342a controlling the pit mat in the down direction, pin elevating mechanism B in the down direction, and the ball carrier A in the down direction, said ball carrier being operated in the up direction upon closure of a switch operated by the weight of the ball on the rods 107 and 108.

Cylinder 301 directs the operation of the machine upon a single ball or strike cycle, the lead 343 controlling the alley sweep F; the lead 344 controlling the pinsetting apparatus, the pin elevating mechanism B in the up direction, and the hopper 140 in the down direction. Since the pinsetting apparatus moves down and then back up without delay it is arranged automatically to reverse, and both movements can be controlled through a single circuit in the program switch. The cycle is completed through the lead 345 operating the pit mat 141 to its up position, the lead 346 operating the hopper 140 to its up position; and the lead 347 controlling the pit mat 141 in the down direction, the pin elevating mechanism B in the down direction, and the ball carrier A in the down direction.

In the event of a gutter ball, the cylinder 302 takes over the operation of the machine, the lead 348 directing the pit mat 141 to its down position, the pin elevating mechanism B to its down position, and the ball carrier to its down position; the lead 349 controlling the pinsetting apparatus to raise it up to its upper position, the pin elevating mechanism B (up), and the hopper 140 (down); the lead 350 controlling the pit mat 141 (up); and the lead 351 controlling the hopper 140 (up).

In the event of a foul by the bowler, a push button or other control (not shown) may be operated to actuate the cylinder 303, and the machine is now controlled through the lead 352 which directs the alley sweep F; the lead 353 which controls the pinsetting apparatus, the pin elevating apparatus B (up) and the hopper 140 (down); the lead 354 which controls the pit mat 141 (up); the lead 355 which controls the hopper 140 (up); and the lead 356 which controls the pit mat 141 (down), the pin elevating mechanism B (down), and the ball carrier A (down).

In the event it is desired to set the machine up so that the alley is clear of pins and the machine operates only to return each ball which is rolled without setting any pins so that the bowler may throw free balls, a push button or other device at the control desk is operated to actuate cylinder 304 which now controls the machine through the lead 358 which controls the sweep F; the lead 359 which controls the pinsetting mechanism, the pin elevating apparatus B (up) and the hopper 140 (down) to take care of pins which are on the alley and in the pit; the lead 360 which controls the pit mat 141 in the up direction; the lead 361 which controls the hopper 140 in the up direction; and the lead 362 which controls the pit mat, the pin elevating apparatus, and the ball carrier A (all down).

I have shown in Fig. 17 mechanism adapted to operate the pin changing apparatus from the program switch. This is done through cylinder 305, and in the event of actuation of this cylinder the machine is controlled through lead 363 which operates the alley sweep; 364 which operates the pinsetting apparatus, the pin elevating apparatus B (up), and the hopper 140 (down); the lead 365 which operates the pit mat 141 in the up direction; the lead 366 which operates the hopper 140 in the up direction; the lead 367 which controls the pit mat 141, the pin elevating apparatus B, and the ball carrier (all down); and the lead 368 which controls the ball carrier in the up direction.

The other leads from the program switch comprise leads 369, 370, 371, 372, 373 and 374, each of which extends from the program switch to operating switches in the machine or at the control desk, as the case may be. The leads from each of the cycle shifting solenoids, as the solenoid 326, run to the appropriate units in the machine in the event of a strike or a gutter ball, or to the appropriate manually controlled switches at the control desk, which control the operation in the event of a foul, a free ball cycle or a pin changing operation.

I claim:

1. In an automatic pinsetting machine for use with bowling apparatus including pins, an alley bed and a pit at the rear end of the bed, in combination, pin elevating apparatus including a pit mat normally located adjacent the floor of said pit, means for elevating said pit mat, said pit mat forming one side of a pin retaining trough during such elevation, means carried by said elevating means and forming another side of said pin retaining trough during such elevation, means for tilting said trough to discharge pins therefrom, a pin hopper normally located above the alley bed, said hopper having retaining sides and a movable bottom portion, means for lowering said hopper into the pit adjacent the elevated pit mat for receiving pins discharged from said trough and for elevating said hopper to a pin discharging position and means for raising the movable bottom in said hopper and discharging pins therefrom.

2. In a pinsetting machine for use with bowling apparatus including pins, an alley bed and a pit at the rear end of the bed, in combination, pin elevating apparatus including a movable pin conveying hopper normally located above the alley bed forwardly of the pit, means for supporting said hopper for movement to a lowered position in the pit and out of the pit to its normal position, means for removing pins from the floor of said pit and discharging them into said hopper when in lowered position in said pit, and means for discharging pins from said hopper when said hopper is in its normal position.

3. In a pinsetting machine for use with bowling apparatus including pins, an alley bed and a pit at the rear of the bed, in combination, pin elevating apparatus including a movable pin conveying hopper having retaining sides and a movable bottom portion, said hopper being normally located above the alley bed forwardly of the pit, means for supporting said hopper for movement to a lowered position in the pit and out of the pit to its normal position, means for removing pins from the floor of said pit and discharging them into said hopper when in lowered position in said pit, and means for raising the movable bottom portion in said hopper to discharge pins from the top thereof when said hopper is in its normal elevated position.

4. In a pinsetting machine for use with bowling apparatus including pins, an alley bed and a pit, in combination, pin changing apparatus including a pin chute, a pin hopper normally operable to elevate pins in use in the machine and discharge them into said pin chute, means selectively operable to place said pin hopper in a different position and to cause said hopper to discharge pins from said machine, a conveyor adapted to hold different pins, said conveyor being located over said pit, and means for causing said conveyor to deliver said different pins to said pin chute.

5. In a pinsetting machine for use with bowling apparatus including pins, an alley bed and a pit and having a pin chute, in combination, pin changing apparatus including a pin hopper normally operable to elevate pins in use in the machine and discharge them into said pin chute, said hopper having a pin changing door, a discharge chute normally located in an inoperative position, means selectively operable to cause said hopper to move to a pin changing position and said discharge chute to move to an operative pin receiving position, means comprising a trip arm operable when the pin hopper is in its pin changing position to open said pin changing door to permit said hopper to discharge pins into said discharge chute, a conveyor located above the pit and adapted to hold different pins, and means for operating said conveyor to feed said different pins to the pin chute.

6. In a pinsetting machine for use with bowling apparatus including a ball, pins, an alley bed, a pit at the rear end of said bed, and a pit cushion forming the rear wall of said pit, in combination, means located above the alley bed and forwardly of the pit for receiving pins, means for removing a ball from the pit, a pin elevating device normally located adjacent to and overlying the floor of the pit forwardly of the pit cushion in position to receive pins and balls from the alley bed, a pin hopper normally located above said alley bed out of the way of pins and balls entering the pit from the alley bed and adapted to be lowered into the pit forwardly of the pit cushion to receive pins directly from said pin elevating device and to be raised to deliver pins to said pin receiving means, means for guiding said hopper in said movements and means operable when the hopper is lowered into the pit to actuate the pin elevating device and discharge pins therefrom into the hopper.

7. In a pinsetting machine for use with bowling apparatus including a ball, pins, an alley bed, a pit at the rear end of said bed, and a pit cushion forming the rear wall of said pit, in combination, means located above the alley bed and forwardly of the pit for receiving pins, means for removing a ball from the pit, means for operating the ball removal means independently of pin removal from the pit, a pin elevating device normally located adjacent the floor of the pit forwardly of the pit cushion, means for elevating said device and discharging pins therefrom, a pin hopper normally located above said alley bed, and means for supporting said hopper for downward movement into said pit forwardly of the pit cushion and for upward movement out of said pit to its normal position, said hopper when in its lower position being adapted to receive pins directly from said elevating device and when in its upper position to deliver pins to said receiving means.

8. A pinsetting machine having, in combination, means for repeatedly moving a complement of pins in a normal circuit through said machine from a pit into a receiving position above the pin deck of an alley bed, said means including means for elevating pins above the pit comprising a pin hopper normally located above the alley bed and adapted to be lowered into the pit to receive pins and to be raised to a pin discharging position, means for guiding said hopper in said movement, a pin chute in said receiving position for receiving pins discharged from said hopper in normal operation, a pin removal chute adjacent said hopper when in a raised position and adapted to receive pins that are to be removed from the machine, means associated with said hopper for causing said hopper to discharge pins into said removal chute when it is desired to remove pins from use in the machine, and means including a conveyor selectively operable to feed a different complement of pins to said pin chute.

9. In a pinsetting machine for use with bowling apparatus including a ball, pins, an alley bed, a pit at the rear end of said bed, and a pit cushion forming the rear end of said pit, in combination, means located above the alley bed and forwardly of the pit for receiving pins for re-use in the machine, a ball carrier for removing a ball from the pit, a pin elevating device normally overlying the floor of said pit and adapted to be elevated above said floor, a pin hopper normally located above said alley bed and adapted to be lowered to receive pins directly from said pin elevating device and to be raised to deliver pins to said pin receiving means, and means for guiding said pin hopper in such movement, means for actuating the pin elevating device to discharge pins into the pin hopper when in its lowered position, said ball carrier, pin elevating device and pin hopper being completely contained within the normal confines of said alley and pit and forwardly of the normal position of said pit cushion.

10. In a pinsetting machine for use with a bowling alley having a bed and a pit at the rear end of the bed, apparatus for changing from one complement of pins to another complement of pins comprising, in combination, a supporting conveyor above the pit for temporarily retaining a complement of reserve pins, pin receiving means located above the alley bed, means for elevating pins from the pit to said receiving means for re-use in the machine including an upwardly and downwardly movable pin carrier, means selectively operable to move said pin carrier to a pin changing position, means operable to remove the pins therein from the machine when the carrier is in said position, and means for operating said supporting conveyor to discharge said temporarily retained reserve pins into the pin receiving means.

11. In a pinsetting machine for use on a bowling alley having a bed, a pit at the rear end of said bed and a pit cushion forming a rear wall of said pit, in combination, a pin hopper movable vertically in the space above the pit, means for guiding the hopper for such movement from a lowered position to a raised position, pin receiving means supported forwardly of the hopper when in its raised position and adapted to receive pins therefrom for re-use in the machine, storage means rearwardly of the pin hopper when in an intermediate position adapted to receive pins from the hopper for transfer out of use by the machine, and means supported adjacent the pin receiving means adapted to support a complement of pins for alternate use in the machine and having means operable to disharge pins therefrom onto the pin receiving means during a pin exchange operation.

12. In a pinsetting machine for use on a bowling alley having a bed, and a pit at the rear end of said bed, in combination, means supported in an elevated position for receiving pins for re-use in the machine, means supported in another elevated position for receiving pins for transfer out of use by the machine, pin elevating means normally operable to elevate a set of pins from said pit to said receiving means, means selectively operable to transfer a set of pins from said pin elevating means to said pin transfer out means, said pin elevating means comprising a hopper, means for guiding said hopper for movement from an upper pin discharging position to a lower pin receiving position in the pit, said pin transfer out means including a chute, and means selectively operable to shift said hopper and chute to adjoining positions wherein pins from the hopper may pass to the chute.

13. In a pinsetting machine for use on a bowling alley having a bed and a pit at the rear end of said bed, in combination, means supported in an elevated position for receiving pins for re-use in the machine, means including a chute supported in another elevated position for receiving pins for transfer out of use by the machine, means for supporting a reserve set of pins for substitution in the machine in place of pins transferred therefrom, pin elevating means including a hopper normally operable to elevate pins from said pit to said receiving means, means for guiding said hopper for movement from an upper pin discharging position to a lower pin receiving position in the pit, means selectively operable to transfer pins from said pin elevating means to said pin transfer-out means including means for shifting said hopper and chute to adjoining positions wherein pins from the hopper may pass into the chute and means selectively operable for delivering pins from the reserve pin support to the pin receiving means.

14. In a pinsetting machine for use on a bowling alley having a bed and a pit at the rear end of said bed, in combination, a first means including a pin spotter located in elevated position above the pit for receiving pins for re-use in the machine, a second means for receiving pins for transfer out of use by the machine, means for storing a reserve set of pins for substitution in the machine in place of pins transferred therefrom including an endless conveyor having its discharge end arranged in pin supplying relation to the first pin receiving means and means on said conveyor for individually supporting pins of the reserve set of pins in prearranged orientation, pin elevating means normally operable to elevate pins from said pit to said first receiving means, means selectively operable to transfer pins from said pin elevating means to said pin transfer-out means, and means selectively operable for actuating said conveyor to discharge a set of pins from said supporting means to said first pin receiving means including means for effecting delivery to said first pin receiving means of pins delivered by said conveyor in pre-determined orientation.

15. In a pinsetting machine for use on a bowling alley having a bed and a pit at the rear end of said bed, means located in elevated position above the pit and including a pin spotter for receiving pins for re-use in the machine, and a pin storage for a reserve set of pins selectively deliverable to the pin receiving means including, an endless conveyor located in elevated position above the pit, a plurality of pin supports spaced along the conveyor for individually supporting pins of said reserve set in prearranged orientation, said conveyor having its discharge end arranged in pin supplying relation to the pin receiving means, and selectively operable means for indexing the conveyor to effect delivery to said pin receiving means by said conveyor of pins in pre-determined orientation.

16. In a pinsetting machine for use with a bowling alley having a bed and a pit at the rear end of the bed, apparatus for changing from one complement of pins to another complement of pins comprising, in combination, pin receiving means located above the alley bed, means for conveying pins from the pit to said receiving means for re-use in the machine including an upwardly and downwardly movable conveyor, a first pin supporting device located at one position for temporarily retaining a complement of reserve pins and having a discharge end located to discharge pins directly into the pin receiving means, a second pin supporting device located at a position remote from the first pin supporting device and being independent thereof for receiving pins transferred out of use from the machine, selectively operable means for transferring pins from the machine and directing them to the second pin supporting device, and means for operating said first pin supporting device to discharge said temporarily retained reserve pins into the pin receiving means.

17. In a pinsetting machine for use with bowling apparatus including pins, an alley bed and a pit at the rear end of the bed, in combination, pin elevating apparatus including a pit mat normally located adjacent the floor of said pit, means for elevating said pit mat, such means comprising a first member pivoted at its rear end at a fixed point, and a second member having its front end pivotally connected to the front end of said first member and its rear end movable along a vertical guide, said pit mat forming one side of a pin retaining trough during such elevation, means carried by said elevating means and forming another side of said pin retaining trough during such elevation, means for moving the pit mat relative to said last mentioned means to discharge pins from the trough, such means comprising an arm having said pit mat pivoted on its front end, and having its rear end pivoted on said second member adjacent said vertical guide, and hydraulic means for raising said arm, a pin hopper normally located above the alley bed, said hopper having retaining sides and a movable bottom portion, said hopper being normally located above the alley bed forwardly of the pit, means for lowering said hopper into the pit adjacent the elevated pit mat to receive pins discharged directly from said trough and for elevating said hopper to a pin discharging position, and means for raising the movable bottom portion in said hopper to discharge pins from the top thereof.

18. In a pinsetting machine for use with bowling apparatus including a ball, pins, an alley bed, a pit at the rear end of said bed, and a pit cushion forming the rear wall of said pit, in combination, means located above the alley bed and forwardly of the pit for receiving pins, means for removing a ball from the pit, means for operating the ball removal means independently of pin removal from the pit, a pin elevating device normally overlying the floor of the pit forwardly of the pit cushion, means for elevating said device to an elevated position and for operating said device to discharge pins therefrom, a pin hopper normally located above said alley bed adjacent the pin receiving means, and means for supporting said hopper for downward movement into said pit forwardly of the pit cushion and for upward movement out of said pit to its normal position, said hopper when in its lower position being adapted to receive pins discharged from said elevating device and when in its upper position to deliver pins to said receiving means.

References Cited in the file of this patent

UNITED STATES PATENTS

| | | |
|---|---|---|
| 1,122,622 | McFarland | Dec. 29, 1914 |
| 1,468,212 | Redfield | Sept. 18, 1923 |
| 1,557,177 | Lorenz et al. | Oct. 13, 1925 |
| 1,590,124 | Roble | June 22, 1926 |
| 1,625,980 | Brinkman | Apr. 26, 1927 |
| 1,627,414 | Schaffer | May 3, 1927 |
| 2,242,069 | Heiniger | May 13, 1941 |
| 2,294,573 | Potter | Sept. 1, 1942 |
| 2,300,802 | Parra et al. | Nov. 3, 1942 |
| 2,341,475 | Parra et al. | Feb. 8, 1944 |
| 2,341,476 | Parra et al. | Feb. 8, 1944 |
| 2,389,643 | Schmidt | Nov. 27, 1945 |
| 2,711,318 | Schmidt | June 21, 1955 |
| 2,736,555 | Fluke | Feb. 28, 1956 |